(12) United States Patent
Nishimura et al.

(10) Patent No.: US 12,431,532 B2
(45) Date of Patent: Sep. 30, 2025

(54) ELECTROLYTE COMPOSITION, SECONDARY CELL, AND METHOD FOR MANUFACTURING ELECTROLYTE SHEET

(71) Applicant: LG ENERGY SOLUTION, LTD., Seoul (KR)

(72) Inventors: Katsunori Nishimura, Tokyo (JP); Nobuyuki Ogawa, Tokyo (JP); Hideyuki Ogawa, Tokyo (JP); Yuma Gogyo, Tokyo (JP); Hiroki Mikuni, Tokyo (JP); Takuya Nishimura, Tokyo (JP); Kenji Takaoka, Tokyo (JP); Miyuki Muromachi, Tokyo (JP)

(73) Assignee: LG ENERGY SOLUTION, LTD., Seoul (KR)

( * ) Notice: Subject to any disclaimer, the term of this patent is extended or adjusted under 35 U.S.C. 154(b) by 308 days.

(21) Appl. No.: 16/617,048

(22) PCT Filed: May 31, 2018

(86) PCT No.: PCT/JP2018/021011
§ 371 (c)(1),
(2) Date: Nov. 26, 2019

(87) PCT Pub. No.: WO2018/221670
PCT Pub. Date: Dec. 6, 2018

(65) Prior Publication Data
US 2021/0075054 A1 Mar. 11, 2021

(30) Foreign Application Priority Data

Jun. 1, 2017 (JP) .............................. 2017-109486
Jun. 1, 2017 (WO) ................. PCT/JP2017/020487

(51) Int. Cl.
*H01M 10/056* (2010.01)
*C08L 27/16* (2006.01)
(Continued)

(52) U.S. Cl.
CPC ............ *H01M 10/056* (2013.01); *C08L 27/16* (2013.01); *H01M 4/0407* (2013.01);
(Continued)

(58) Field of Classification Search
CPC .................................................. H01M 10/056
See application file for complete search history.

(56) References Cited

U.S. PATENT DOCUMENTS 6,395,419 B1 5/2002 Kuwahara et al.
2005/0221188 A1 10/2005 Takami et al.
(Continued)

FOREIGN PATENT DOCUMENTS

CN 101162791 A 4/2008
CN 102522589 A1 6/2012
(Continued)

OTHER PUBLICATIONS

Zhang; "Ionic Liquid-Doped Gel Polymer Electrolyte for Flexible Lithium-Ion Polymer Batteries" (Year: 2015).*
(Continued)

*Primary Examiner* — Nathanael T Zemui
(74) *Attorney, Agent, or Firm* — Bryan Cave Leighton Paisner LLP

(57) ABSTRACT

Provided is an electrolyte composition, comprising one or two or more polymers, oxide particles, at least one electrolyte salt selected from the group consisting of a lithium salt, a sodium salt, a calcium salt, and a magnesium salt, and a solvent, wherein structural units constituting the one or two or more polymers comprises a first structural unit selected from the group consisting of tetrafluoroethylene and vinylidene fluoride, and a second structural unit selected from the group consisting of hexafluoropropylene, acrylic acid, maleic acid, ethyl methacrylate, and methyl methacrylate, a content of the one or two or more polymers is more
(Continued)

than 90% by mass based on a total amount of polymers in the electrolyte composition, and a mass ratio of a content of the first structural unit to a content of the second structural unit in the one or two or more polymers is 50/50 or more.

10 Claims, 5 Drawing Sheets

(51) Int. Cl.
  *H01M 4/04* (2006.01)
  *H01M 10/0525* (2010.01)

(52) U.S. Cl.
  CPC .................. *H01M 10/0525* (2013.01); *H01M 2300/0037* (2013.01); *H01M 2300/0085* (2013.01); *H01M 2300/0094* (2013.01)

(56) References Cited

U.S. PATENT DOCUMENTS

| | | | |
|---|---|---|---|
| 2008/0160324 A1 | 7/2008 | Ohmori et al. | |
| 2010/0075222 A1 | 3/2010 | Watanabe | |
| 2012/0301794 A1 | 11/2012 | Koh et al. | |
| 2013/0106029 A1 | 5/2013 | Snyder et al. | |
| 2015/0079485 A1 | 3/2015 | Choi et al. | |
| 2015/0155566 A1 | 6/2015 | Kim et al. | |
| 2016/0149224 A1 | 5/2016 | Okuno | |
| 2016/0181658 A1 | 6/2016 | Kim et al. | |
| 2016/0248115 A1* | 8/2016 | Hatta | H01M 10/056 |
| 2017/0018802 A1* | 1/2017 | Omoda | H01M 4/5825 |
| 2017/0222244 A1* | 8/2017 | Kim | H01M 10/0525 |
| 2018/0277897 A1* | 9/2018 | Sugita | H01M 4/366 |
| 2019/0103631 A1* | 4/2019 | Okae | H01M 10/0525 |
| 2021/0111430 A1 | 4/2021 | Ogawa | |
| 2021/0135275 A1 | 5/2021 | Ogawa | |

FOREIGN PATENT DOCUMENTS

| | | | | |
|---|---|---|---|---|
| CN | 102754267 A | | 10/2012 | |
| CN | 103329335 A | | 9/2013 | |
| CN | 105529496 A | * | 4/2016 | ............. B82Y 30/00 |
| CN | 110537274 A | | 12/2019 | |
| EP | 1619742 A | | 1/2006 | |
| EP | 2415793 A1 | | 2/2012 | |
| EP | 3279973 A1 | | 2/2018 | |
| JP | H11-162513 A | | 6/1999 | |
| JP | 2000-090728 A | | 3/2000 | |
| JP | 2000-164254 A | | 6/2000 | |
| JP | 2003077539 A | * | 3/2003 | |
| JP | 2006-032237 A | | 2/2006 | |
| JP | 2006-049158 A | | 2/2006 | |
| JP | 2006-120517 A | | 5/2006 | |
| JP | 2006-294326 A | | 10/2006 | |
| JP | 2007-141467 A | | 6/2007 | |
| JP | 2008-053135 A | | 3/2008 | |
| JP | 2008-243736 A | | 10/2008 | |
| JP | 2010-153375 A | | 7/2010 | |
| JP | 2011-054519 A | | 3/2011 | |
| JP | 2011-070793 A | | 4/2011 | |
| JP | 2011-108499 A | | 6/2011 | |
| JP | 2011-129400 A | | 6/2011 | |
| JP | 2012-518248 A | | 8/2012 | |
| JP | 2013-019154 A | | 1/2013 | |
| JP | 2013-191547 A | | 9/2013 | |
| JP | 2013-214510 A | | 10/2013 | |
| JP | 2014-007258 A | | 1/2014 | |
| WO | 99/040025 A1 | | 8/1999 | |
| WO | 2011/037060 A1 | | 3/2011 | |
| WO | 2015/068324 A1 | | 5/2015 | |
| WO | 2015/097952 A1 | | 7/2015 | |
| WO | 2017/047015 A1 | | 3/2017 | |

OTHER PUBLICATIONS

JP2003077539A Translation from Espacenet (Year: 2003).*
CN105529496A Translation from Espacenet (Year: 2016).*
Yoshizawa-Fujita et al., "A Plastic Elecrtolyte Material in a Highly Desirable Temprature Range: N-Ethyl-N-methylpyrrolidinium Bis(fluorosulfonyl)amide", Chemistry Letters, 2014; vol. 43, p. 1909-p. 1911 (cited in an office action dated Aug. 27, 2021 in U.S. Appl. No. 16/606,493).
G.B. .Appetecchi et al., "Ternary polymer electrolytes containing pyrrolidinium-based polymeric ionicliquids for lithium batteries", Journal of Power Sources vol. 195(11), 2010, p. 3668-p. 3675 (cited in ISRs of Appln. No. PCT/JP2018/016318 dated Jun. 12, 2018 and PCT/JP2017/016079 dated Jul. 4, 2017).
Anne-Laure Pont et al., "Pyrrolidinium-based polymeric ionic liquids as mechanically andelectrochemicaily stable polymer electrolytes", Journal of Power Sources vol. 188 (2), 2009, p. 558-p. 563 (cited in ISRs of Appln. No. PCT/JP2018/016318 dated Jun. 12, 2018 and PCT/JP2017/016079 dated Jul. 4, 2017, and in specification of copending U.S. Appl. No. 16/606,273).
P. Hovington et al., "New Lithium Metal Polymer Solid State Battery for an Ultrahigh Energy: Nano C—LiFePO4 versus Nano Li1.2V3O8", Nano Letters, 2015, 15(4), p. 2671-p. 2678 (cited in specification of copending U.S. Appl. No. 16/606,493).
Brinkkötter et al., "Influence of anion structure on ion dynamics in polymer gel electrolytes composed of poly(ionic iquid), ionic liquid and Li salt", Electrochimica Acta, 237, May 2017, p. 237-p. 247 (cited in an office action dated Apr. 26, 2021 in U.S. Appl. No. 16/606,493).
Safa et al., "Polymeric Ionic Liquid Gel Electrolyte for Room Temperature Lithium Battery Applications", Electrochimica Acta,213, Sep. 2016, p. 587-p. 593 (cited in an office action dated Apr. 26, 2021 in U.S. Appl. No. 16/606,493).
Li et al., "Polymeric ionic liquid-ionic plastic crystal all-solid-state electrolytes for wide operating temperature range lithium metal batteries", Journal of Materials Chemistry A,5, Sep. 2017, p. 21362-p. 21369 (cited in an office action dated Apr. 26, 2021 in U.S. Appl. No. 16/606,493).
Bhandary Rajesh el al, "Polymer effect on lithium ion dynamics in gel polymer electrolytes: Cationic versus acrylate polymer", Electrochimica Acta, Elsevier, Amsterdam, NL, vol. 174, Jun. 11, 2015, p. 753-p. 761, XP029250951 (cited in a Search Report in counterpart EP Patent Application No. 17906396.1 dated Oct. 28, 2020).
Kaiya Koji, "High School Course TV Learning Memo: Molecular Polarity", online, NHK accessed on Feb. 14, 2020 https://www.nhk.or.jp/kokokoza/library/tv/kagakukiso/ , Oct. 2019 (cited in an office action in counterpart JP Patent Application No. P2019-510989 dated Feb. 20, 2020).
Oeda Kazunari, "Properties of Teflon® Fluorine Resin", online, Packing Land Co., Ltd. accessed on Feb. 14, 2020 URL: https://www.packing.co.jp/PTFE/ptfe_tokusei1.htm, Oct. 2006 (cited in an office action in counterpart JP Patent Application No. P2019-510989 dated Feb. 20, 2020).
Yundong Zhou et al., "N-ethyl-N-methylpyrrolidinium bis(fluorosulfonyl)imide-electrospun polyvinylidene fluoride composite electrolytes: characterization and lithium cell studies", Phys. Chem. Chem. Phys., vol. 19, Dec. 19, 2016, p. 2225-p. 2234 (cited in an office action dated Aug. 18, 2022 in CN Patent Application No. 201780089690.4 (not counterpart)).

* cited by examiner (a)

(b)

ELECTROLYTE COMPOSITION, SECONDARY CELL, AND METHOD FOR MANUFACTURING ELECTROLYTE SHEET

CROSS-REFERENCE TO RELATED APPLICATIONS

This application is a U.S. national phase application filed under 35 U.S.C. § 371 of International Application No. PCT/JP2018/021011, filed May 31, 2018, designating the United States, which claims priority from Japanese Patent Application No. 2017-109486, filed Jun. 1, 2017, and International Application No. PCT/JP2017/020487, filed Jun. 1, 2017, which are hereby incorporated herein by reference in their entirety.

TECHNICAL FIELD

The present invention relates to an electrolyte composition, a secondary battery, and a method for manufacturing an electrolyte sheet.

BACKGROUND ART

In recent years, with the widespread use of portable electronic devices, electric vehicles, and the like, high performance secondary batterys are required. Among such batterys, lithium secondary batterys have been attracting attention as a power source for electric vehicle batteries, power storage batteries, and the like because of their high energy density. Specifically, lithium secondary batterys as batteries for electric vehicles are employed in electric vehicles such as zero-emission electric vehicles that are not equipped with an engine, hybrid electric vehicles that are equipped with an engine and a secondary battery, and plug-in hybrid electric vehicles that are charged directly from the power system. In addition, lithium secondary batterys as power storage batteries are employed in, for example, stationary power storage systems that supply power stored in advance in an emergency when the power system is shut off.

In order to use in such a wide range of applications, there is a need for lithium secondary batterys having even higher energy density, and development of such batterys is being carried out. In particular, since lithium secondary batterys for electric vehicles require high safety in addition to high input/output characteristics and high energy density, more advanced technology for ensuring safety is required.

Conventionally, as a method for improving the safety of a lithium secondary battery, there are known a method for making an electrolyte solution flame-retardant by adding a flame retardant, a method for changing the electrolyte solution to a polymer electrolyte or a gel electrolyte, and the like. In particular, a gel electrolyte has the same ionic conductivity as the electrolyte solution used in conventional lithium secondary batterys; therefore, by changing the electrolyte solution to a gel electrolyte, combustion of the electrolyte solution can be suppressed by reducing the amount of the electrolyte solution that is released without degrading the battery performance.

Patent Literature 1 discloses a gel electrolyte layer containing a lithium salt-containing plasticizer, a matrix polymer in which a plasticizer is dispersed, and a fibrous insoluble material. The fibrous insoluble material contained in the gel electrolyte in an amount of 0.1% by weight or more and 50% by weight or less has a ratio of fiber length to fiber diameter of 10 or more and 3000 or less, a fiber length of 10 μm or more and 1 cm or less, and a fiber diameter of 0.05 μm or more and 50 μm or less; by setting in this manner, the cycle characteristics and high-temperature storage characteristics of the battery are improved.

Patent Literature 2 discloses a gel electrolyte and a gel electrolyte battery. The gel electrolyte layer is formed by swelling a matrix polymer with an electrolyte solution, and contains a large amount of a low viscosity solvent having a low boiling point. By using a gel electrolyte containing a large amount of low-viscosity solvent having a low boiling point, a gel electrolyte battery having excellent temperature characteristics, current characteristics, capacity, and charge/discharge characteristics at low temperatures is provided.

CITATION LIST

Patent Literature

Patent Literature 1: Japanese Unexamined Patent Publication No. 2000-164254
Patent Literature 2: Japanese Unexamined Patent Publication No. 2007-141467

SUMMARY OF INVENTION

Technical Problem

However, there is still room for improvement in conventional gel electrolytes such as those described above. For example, in the invention described in Patent Literature 1, it is difficult to suitably form an electrolyte sheet (particularly, to make the electrolyte layer a thin layer) and to increase conductivity. Further, in the invention described in Patent Literature 2, the conductivity of the electrolyte is insufficient.

Therefore, it is an object of the present invention to provide an electrolyte composition having high conductivity and that is capable of obtaining an electrolyte sheet having excellent smoothness.

Solution to Problem

A first aspect of the present invention is an electrolyte composition, comprising: one or two or more polymers; oxide particles; at least one electrolyte salt selected from the group consisting of a lithium salt, a sodium salt, a calcium salt, and a magnesium salt; and a solvent, wherein structural units constituting the one or two or more polymers comprise a first structural unit selected from the group consisting of tetrafluoroethylene and vinylidene fluoride, and a second structural unit selected from the group consisting of hexafluoropropylene, acrylic acid, maleic acid, ethyl methacrylate, and methyl methacrylate, a content of the one or two or more polymers is more than 90% by mass based on a total amount of polymers in the electrolyte composition, and a mass ratio of a content of the first structural unit to a content of the second structural unit in the one or two or more polymers is 50/50 or more.

This electrolyte composition has excellent conductivity, and is capable of obtaining an electrolyte sheet having excellent smoothness. Moreover, this electrolyte composition is suitable for the preparation of a slurry when forming into a sheet, and when the electrolyte composition is formed into a sheet, the obtained electrolyte sheet has excellent tensile strength. According to this electrolyte composition, it is possible to manufacture a lithium secondary battery having excellent discharge rate characteristics and high so-called initial characteristics in which the initial discharge capacity (initial capacity) is as close as possible to the design capacity.

The one or two or more polymers may comprise a copolymer comprising both the first structural unit and the second structural unit.

The one or two or more polymers may comprise at least two polymers of a first polymer comprising the first structural unit and a second polymer comprising the second structural unit.

The content of the one or two or more polymers is preferably 3 to 50% by mass based on the total amount of the electrolyte composition.

The oxide particles are preferably particles of at least one selected from the group consisting of $SiO_2$, $Al_2O_3$, AOOOH, MgO, CaO, $ZrO_2$, $TiO_2$, $Li_7La_3Zr_2O_{12}$, and $BaTiO_3$.

The content of the oxide particles is preferably 5 to 40% by mass based on the total amount of the electrolyte composition.

The solvent may be a glyme represented by the following formula (1),

$$R^1O\text{---}(CH_2CH_2O)_k\text{---}R^2 \quad (1)$$

wherein $R^1$ and $R^2$ each independently represent an alkyl group having 4 or less carbon atoms or a fluoroalkyl group having 4 or less carbon atoms, and k represents an integer of 1 to 6.

The solvent may be an ionic liquid.

The ionic liquid may comprise, as a cation component, at least one selected from the group consisting of a chain-like quaternary onium cation, a piperidinium cation, a pyrrolidinium cation, a pyridinium cation, and an imidazolium cation, and as an anion component, at least one of anion components represented by the following formula (2),

$$N(SO_2C_mF_{2m+1})(SO_2C_nF_{2n+1})^- \quad (2)$$

wherein m and n each independently represent an integer of 0 to 5.

The total content of the electrolyte salt and the solvent is preferably 25 to 70% by mass based on the total amount of the electrolyte composition.

The electrolyte composition may be formed into a sheet.

A second aspect of the present invention is a secondary battery, comprising: a positive electrode; a negative electrode; and an electrolyte layer consisting of the electrolyte composition disposed between the positive electrode and the negative electrode.

A third aspect of the present invention is a method for manufacturing an electrolyte sheet, comprising: disposing on a substrate a slurry comprising one or two or more polymers, oxide particles, at least one electrolyte salt selected from the group consisting of a lithium salt, a sodium salt, a calcium salt, and a magnesium salt, a solvent, and a dispersion medium; and volatilizing the dispersion medium to form an electrolyte layer on the substrate, wherein structural units constituting the one or two or more polymers comprises a first structural unit selected from the group consisting of tetrafluoroethylene and vinylidene fluoride, and a second structural unit selected from the group consisting of hexafluoropropylene, acrylic acid, maleic acid, ethyl methacrylate, and methyl methacrylate, a content of the one or two or more polymers is more than 90% by mass based on a total amount of polymers included in a solid content of the slurry, and a mass ratio of a content of the first structural unit to a content of the second structural unit in the one or two or more polymers is 50/50 or more.

Advantageous Effects of Invention

According to the present invention, there can be provided an electrolyte composition having high conductivity and that is capable of obtaining an electrolyte sheet having excellent smoothness.

DESCRIPTION OF EMBODIMENTS

Hereinafter, embodiments of the present invention will be described with appropriate reference to the drawings. However, the present invention is not limited to the following embodiments. In the following embodiments, the components (including steps and the like) are not essential unless otherwise specified. The size of the components in each figure is conceptual, and the relative relationship of the size between the components is not limited to that shown in each figure.

The numerical values and ranges thereof in present specification do not limit the present invention. In present specification, a numerical range indicated by using the word "to" indicates a range including the numerical values described before and after the word "to" as the minimum value and the maximum value, respectively. In the numerical ranges described in stages in present specification, the upper limit value or the lower limit value described in one numerical range may be replaced with the upper limit value or the lower limit value described in another stage of the description. Moreover, in the numerical ranges described in the present specification, the upper limit value or the lower limit value of the numerical range may be replaced with the values shown in the Examples.

First Embodiment

Figure 1:
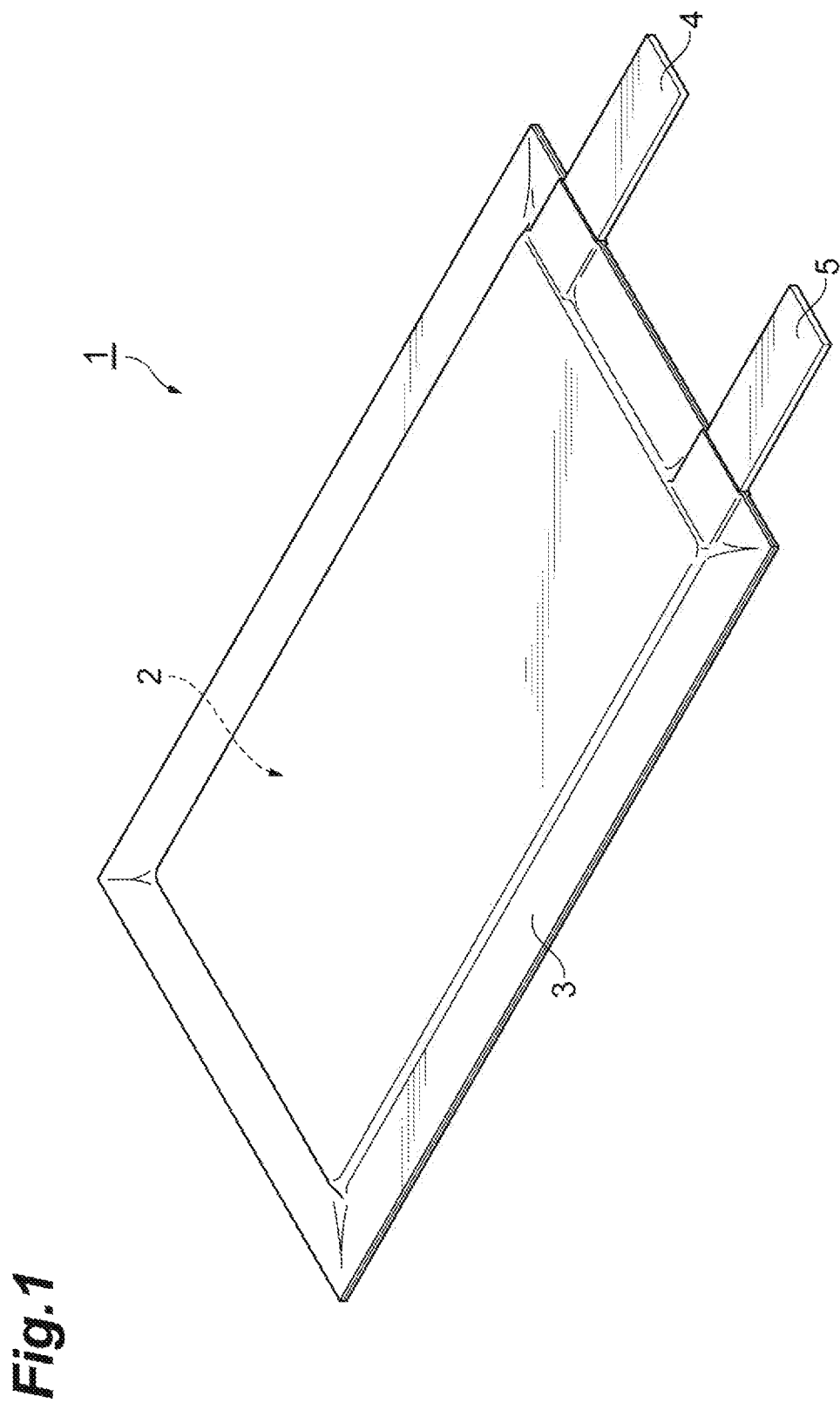
FIG. 1 is a perspective view illustrating a secondary battery according to a first embodiment.

FIG. 1 is a perspective view illustrating a secondary battery according to a first embodiment. As illustrated in FIG. 1, a secondary battery 1 includes an electrode group 2 constructed of a positive electrode, a negative electrode, and an electrolyte layer, and a bag-shaped battery outer casing 3 housing the electrode group 2. A positive electrode current collecting tab 4 and a negative electrode current collecting tab 5 are provided on the positive electrode and the negative electrode, respectively. The positive electrode current collecting tab 4 and the negative electrode current collecting tab 5 protrude from the inside of the battery outer package 3 to the outside such that the positive electrode and the negative electrode can each be electrically connected to the outside of the secondary battery 1.

The battery outer casing 3 may be formed of a laminate film, for example. The laminate film may be a laminate film in which a resin film such as a polyethylene terephthalate (PET) film, a metal foil such as aluminum, copper, and stainless steel, and a sealant layer such as polypropylene are laminated in that order.

Figure 2:
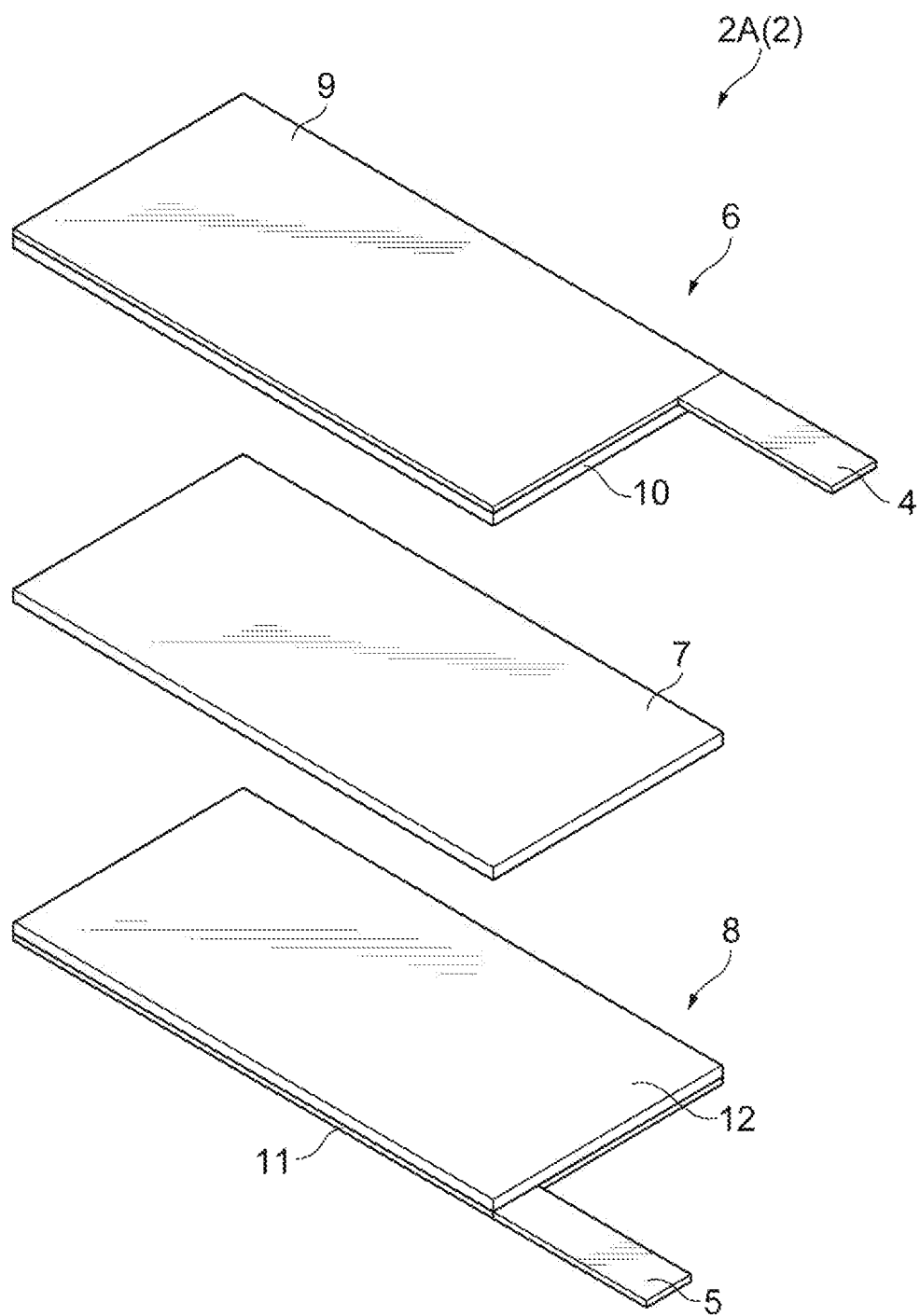
FIG. 2 is an exploded perspective view for illustrating an embodiment of an electrode group in the secondary battery illustrated in FIG. 1.
Figure 3:
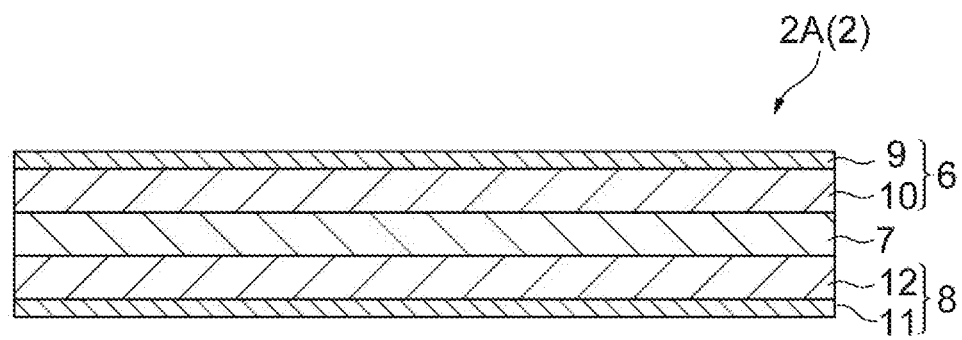
FIG. 3 is a schematic cross-sectional view illustrating an embodiment of the electrode group in the secondary battery illustrated in FIG. 1.

FIG. 2 is an exploded perspective view illustrating an embodiment of the electrode group 2 in the secondary battery 1 illustrated in FIG. 1. FIG. 3 is a schematic cross-sectional view illustrating an embodiment of the electrode group 2 in the secondary battery 1 illustrated in FIG. 1. As illustrated in FIGS. 2 and 3, an electrode group 2A according to the present embodiment includes a positive electrode 6, an electrolyte layer 7, and a negative electrode 8 in this order. The positive electrode 6 includes a positive electrode current collector 9 and a positive electrode mixture layer 10 provided on the positive electrode current collector 9. The positive electrode current collecting tab 4 is provided on the positive electrode current collector 9. The negative electrode 8 includes a negative electrode current collector 11 and a negative electrode mixture layer 12 provided on the negative electrode current collector 11. The negative electrode current collecting tab 5 is provided on the negative electrode current collector 11.

The positive electrode current collector 9 may be formed of aluminum, stainless steel, titanium, or the like. Specifically, the positive electrode current collector 9 may be, for example, an aluminum perforated foil having holes with a hole diameter of 0.1 to 10 mm, an expanded metal, a foam metal plate, or the like. In addition to the above, the positive electrode current collector 9 may be formed of any material as long as it does not cause changes such as dissolution and oxidation during use of the battery; the shape, production method, and the like of the positive electrode current collector 9 are not limited.

The thickness of the positive electrode current collector 9 may be 10 to 100 μm; from the viewpoint of reducing the overall volume of the positive electrode, the thickness is preferably 10 to 50 μm; and from the viewpoint of winding the positive electrode with a small curvature when forming the battery, the thickness is more preferably 10 to 20 μm.

In one embodiment, the positive electrode mixture layer 10 contains a positive electrode active material, a conductive agent, and a binder.

The positive electrode active material may be $LiCoO_2$, $LiNiO_2$, $LiMn_2O_4$, $LiMnO_3$, $LiMn_2O_3$, $LiMnO_2$, $Li_4Mn_5O_{12}$, $LiMn_{2-a}M^1{}_aO_2$ wherein $M^1$ is one selected from the group consisting of Co, Ni, Fe, Cr, Zn, and Ta, and a=0.01 to 0.2, $Li_2Mn_3M^2O_8$ wherein $M^2$ is one selected from the group consisting of Fe, Co, Ni, Cu, and Zn, $Li_{1-b}M^3{}_bMn_2O_4$ wherein $M^3$ is one selected from the group consisting of Mg, B, Al, Fe, Co, Ni, Cr, Zn, and Ca, and b=0.01 to 0.1, $LiFeO_2$, $Fe_2(SO_4)_3$, $LiCo_{1-c}M^4{}_cO_2$ wherein $M^4$ is one selected from the group consisting of Ni, Fe, and Mn, and c=0.01 to 0.2, $LiNi_{1-d}M^5{}_dO_2$ wherein $M^5$ is one selected from the group consisting of Mn, Fe, Co, Al, Ga, Ca, and Mg, and d=0.01 to 0.2, $Fe(MoO_4)_3$, $FeF_3$, $LiFePO_4$, $LiMnPO_4$, and the like.

The positive electrode active material may be primary particles that have not been granulated or may be secondary particles that have been granulated.

The particle size of the positive electrode active material is adjusted to be equal to or less than the thickness of the positive electrode mixture layer 10. If there are coarse particles having a particle size equal to or more than the thickness of the positive electrode mixture layer 10 in the positive electrode active material, the coarse particles are removed in advance by sieving classification, wind classification, or the like, and a positive electrode active material having a particle size equal to or less than the thickness of the positive electrode mixture layer 10 is selected.

The average particle size of the positive electrode active material is, from the viewpoint of suppressing deterioration in the filling property of the positive electrode active material due to the decrease in the particle size and increasing an electrolyte salt retention ability, preferably 0.1 μm or more, more preferably 1 μm or more, further preferably 2 μm or more, and preferably 30 μm or less, 25 μm or less, 20 μm or less, 10 μm or less, or 8 μm or less. The average particle size of the positive electrode active material is the particle size (D50) when the ratio (volume fraction) with respect to the volume of the whole positive electrode active material is 50%. The average particle size (D50) of the positive electrode active material is calculated by measuring a suspension of the positive electrode active material suspended in water by a laser scattering method using a laser scattering particle size measuring device (e.g., Microtrac).

The content of the positive electrode active material may be, based on the total amount of the positive electrode mixture layer, 70% by mass or more, 80% by mass or more, or 85% by mass or more. The content of the positive electrode active material may be, based on the total amount of the positive electrode mixture layer, 99% by mass or less, 95% by mass or less, 92% by mass or less, or 90% by mass or less.

The conductive agent may be a carbon material such as carbon black, acetylene black, graphite, carbon fiber, or carbon nanotube. These conductive agents are used alone or in combination of two or more.

The content of the conductive agent may be, based on the total amount of the positive electrode mixture layer, 0.1% by mass or more, 1% by mass or more, or 3% by mass or more. From the viewpoint of suppressing an increase in the volume of the positive electrode 6 and the accompanying decrease in the energy density of the secondary battery 1, the content of the conductive agent is, based on the total amount of the positive electrode mixture layer, preferably 15% by mass or less, more preferably 10% by mass or less, and further preferably 8% by mass or less.

The binder is not limited as long as it does not decompose on the surface of the positive electrode 6, but is, for example, a polymer. The binder may be a cellulose such as carboxymethyl cellulose, cellulose acetate, and ethyl cellulose, a polymer containing as a monomer unit at least one selected from the group consisting of tetrafluoroethylene, vinylidene fluoride, hexafluoropropylene, acrylic acid, maleic acid, ethyl methacrylate, and methyl methacrylate, or a rubber such as styrene-butadiene rubber, ethylene-propylene rubber, isoprene rubber, acrylic rubber, or fluororubber. The binder may be polyvinylidene fluoride, polyacrylic acid, polyimide, polyamide, or the like. The binder is preferably a copolymer containing tetrafluoroethylene and vinylidene fluoride as structural units, or a copolymer containing vinylidene fluoride and hexafluoropropylene as structural units.

The binder content may be, based on the total amount of the positive electrode mixture layer, 0.5% by mass or more, 1% by mass or more, or 3% by mass or more. The binder content may be, based on the total amount of the positive electrode mixture layer, 20% by mass or less, 15% by mass or less, 10% by mass or less, or 7% by mass or less.

The positive electrode mixture layer 10 may further contain an ionic liquid to be described later. In that case, the content of the ionic liquid is, based on the total amount of the positive electrode mixture layer, preferably 3% by mass or more, more preferably 5% by mass or more, and further preferably 10% by mass or more, and preferably 30% by mass or less, more preferably 25% by mass or less, and further preferably 20% by mass or less.

From the viewpoint of further improving the conductivity, the thickness of the positive electrode mixture layer 10 is equal to or more than the average particle size of the positive electrode active material; specifically, the thickness of the positive electrode mixture layer 10 is preferably 5 μm or more, more preferably 10 μm or more, further preferably 15 μm or more, and particularly preferably 20 μm or more. The thickness of the positive electrode mixture layer 10 is preferably 100 μm or less, more preferably 80 μm or less, further preferably 70 μm or less, and particularly preferably 50 μm or less. By setting the thickness of the positive electrode mixture layer 10 to 100 μm or less, imbalances in charging/discharging caused by variations in the charge level of the positive electrode active material near the surface of the positive electrode mixture layer 10 and near the surface of the positive electrode current collector 9 can be suppressed.

The density of the mixtures of the positive electrode mixture layer 10 is preferably 2 g/cm$^3$ or more from the viewpoint of bringing the conductive agent and the positive electrode active material into close contact with each other and reducing the electronic resistance of the positive electrode mixture layer 10.

The negative electrode current collector 11 may be formed of aluminum, copper, stainless steel, titanium, nickel, an alloy thereof, or the like. Specifically, the negative electrode current collector 11 may be a rolled copper foil, for example, a copper perforated foil having holes with a hole diameter of 0.1 to 10 mm, an expanded metal, a foam metal plate, or the like. The negative electrode current collector 11 may be formed of any material other than the above, and its shape, production method, and the like are not limited.

The thickness of the negative electrode current collector 11 may be 10 to 100 μm; from the viewpoint of reducing the overall volume of the negative electrode, the thickness is preferably 10 to 50 μm; and from the viewpoint of winding the negative electrode with a small curvature when forming the battery, the thickness is more preferably 10 to 20 μm.

In one embodiment, the negative electrode mixture layer 12 contains a negative electrode active material and a binder.

As the negative electrode active material, a material commonly used in the field of energy devices can be used. Specific examples of the negative electrode active material include metal lithium, lithium alloys or other metal compounds, carbon materials, metal complexes, and organic polymer compounds. One of the above-mentioned examples may be used alone for the negative electrode active material, or two or more may be used in combination. The negative electrode active material is preferably a carbon material. Examples of carbon materials include graphite such as natural graphite (flake graphite etc.) and artificial graphite, amorphous carbon, carbon fiber, and carbon black such as acetylene black, ketjen black, channel black, furnace black, lamp black, and thermal black. The negative electrode active material may also be, from the viewpoint of obtaining a larger theoretical capacity (e.g., 500 to 1500 Ah/kg), silicon, tin, or a compound (an oxide, nitride, alloy with another metal) containing these elements. When a material having a large capacity is used, the thickness of the negative electrode mixture layer 12 can be reduced, and the electrode area that can be housed in the secondary battery 1 can be increased. As a result, the resistance of the secondary battery 1 can be reduced, which enables higher output, and at the same time, the capacity of the secondary battery 1 can be increased as compared with the case where a graphite negative electrode is used.

The average particle size (D50) of the negative electrode active material is, from the viewpoint of obtaining a well-balanced negative electrode 8 in which an increase in irreversible capacity due to a decrease in particle size is suppressed and the electrolyte salt retention ability is increased, preferably 1 μm or more, more preferably 5 μm or more, and further preferably 10 μm or more, and preferably 50 μm or less, more preferably 40 μm or less, and further preferably 30 μm or less. The average particle size (D50) of the negative electrode active material is measured by the same method as that for the average particle size (D50) of the positive electrode active material.

The binder and its content may be the same as described above for the binder and its content in the positive electrode mixture layer 10.

The negative electrode mixture layer 12 may further contain a conductive agent from the viewpoint of further reducing the resistance of the negative electrode 8. The negative electrode mixture layer 12 may further contain an ionic liquid. The kind and content of the conductive agent and the ionic liquid may be the same as the kind and content of the conductive agent and the ionic liquid in the positive electrode mixture layer 10 described above.

From the viewpoint of further improving the conductivity, the thickness of the negative electrode mixture layer 12 is equal to or more than the average particle size of the negative electrode active material; specifically, the thickness of the negative electrode mixture layer 12 is preferably 10 μm or more, more preferably 15 μm or more, and further preferably 20 μm or more. The thickness of the negative electrode mixture layer 12 is preferably 100 μm or less, 80 μm or less, 70 μm or less, 50 μm or less, 40 μm or less, or 30 μm or less. By setting the thickness of the negative electrode mixture layer 12 to 100 μm or less, imbalances in charging/discharging caused by variations in the charge level of the positive electrode active material near the surface of the negative electrode mixture layer 12 and near the surface of the negative electrode current collector 11 can be suppressed.

The density of the mixtures of the negative electrode mixture layer 12 is preferably 1 g/cm$^3$ or more from the viewpoint of bringing the conductive agent and the negative electrode active material into close contact with each other and reducing the electronic resistance of the negative electrode mixture layer 12.

The electrolyte layer 7 consists of an electrolyte composition. The electrolyte composition contains one or two or more polymers, oxide particles, at least one electrolyte salt selected from the group consisting of a lithium salt, a sodium salt, a calcium salt, and a magnesium salt, and a solvent. In the present specification, the electrolyte salt and the solvent may be collectively referred to as "electrolyte", and the components of the electrolyte composition excluding the electrolyte may be collectively referred to as "electrolyte support material".

Among the structural units (monomer units) constituting the one or more polymers, a first structural unit (monomer unit) selected from the group consisting of tetrafluoroethylene and vinylidene fluoride and a second structural unit (monomer unit) selected from the group consisting of hexafluoropropylene, acrylic acid, maleic acid, ethyl methacrylate, and methyl methacrylate are included.

The first structural unit and the second structural unit may be included in one polymer and constitute a copolymer. More specifically, in one embodiment, the electrolyte composition contains at least one copolymer including both the first structural unit and the second structural unit. The copolymer may be a copolymer of vinylidene fluoride and hexafluoropropylene, a copolymer of vinylidene fluoride and maleic acid, a copolymer of vinylidene fluoride and methyl methacrylate, and the like. The copolymer may consist of only the first structural unit and the second structural unit, or may further contain a structural unit other than the first structural unit and the second structural unit. When the electrolyte composition contains a copolymer, it may contain only a copolymer containing the first structural unit and the second structural unit, or may further contain another polymer.

The first structural unit and the second structural unit may each be included in different polymers, and consist of at least two of a first polymer having the first structural unit and a second polymer having the second structural unit. Specifically, in one embodiment, the electrolyte composition contains at least two or more polymers of a first polymer including the first structural unit and a second polymer including the second structural unit. When the electrolyte composition contains the first polymer and the second polymer, the electrolyte composition may contain only the first polymer and the second polymer, or may also further contain another polymer.

The first polymer may be a polymer consisting of only the first structural unit, or may be a polymer further having another structural unit in addition to the first structural unit. Another structural unit may be an oxygen-containing hydrocarbon structure such as ethylene oxide (—$CH_2CH_2O$—) or a carboxylic acid ester (—$CH_2COO$—). The first polymer may be polytetrafluoroethylene, polyvinylidene fluoride, polyvinylidene fluoride, or a polymer in which the oxygen-containing hydrocarbon structure is incorporated inside those molecular structures.

The second polymer may be a polymer consisting of only the second structural unit, or may be a polymer further having another structural unit in addition to the second structural unit. Another structural unit may be an oxygen-containing hydrocarbon structure such as ethylene oxide (—$CH_2CH_2O$—) or a carboxylic acid ester (—$CH_2COO$—).

Examples of the combination of the first polymer and the second polymer include polyvinylidene fluoride and polyacrylic acid, polytetrafluoroethylene and polymethyl methacrylate, polyvinylidene fluoride and polymethyl methacrylate, and the like.

From the viewpoint of suppressing gelation of the electrolyte composition and suppressing the occurrence of unevenness when the electrolyte composition is formed into a sheet, it is preferable that the one or two or more polymers do not contain one or both of acrylonitrile and vinyl chloride as the structural unit (monomer unit). Specifically, the electrolyte composition may not contain a polymer including one or both of acrylonitrile and vinyl chloride as a structural unit (monomer unit). When the electrolyte composition contains a copolymer including the first structural unit and the second structural unit, the copolymer may not include one or both of acrylonitrile and vinyl chloride as the structural unit (monomer unit). When the electrolyte composition contains two or more polymers, the first polymer and the second polymer may not contain one or both of acrylonitrile and vinyl chloride as the structural unit (monomer unit), and another polymer other than the first polymer and the second polymer may not contain one or both of acrylonitrile and vinyl chloride as the structural unit (monomer unit).

From the viewpoint of further improving strength when the electrolyte composition is formed into a sheet, the content of the first structural unit is, based on the total content of the first structural unit and the second structural unit, preferably 50% by mass or more, 70% by mass or more, 80% by mass or more, 90% by mass or more, or 95% by mass or more. From the viewpoint of further improving affinity with the solvent when the electrolyte composition contains a solvent, the content of the first structural unit is, based on the total content of the first structural unit and the second structural unit, preferably 99% by mass or less, 98% by mass or less, 97% by mass or less, or 96% by mass or less.

From the viewpoint of further improving strength when the electrolyte composition is formed into a sheet, the content of the first structural unit is, based on the total amount of the structural units constituting the polymer, preferably 5% by mass or more, 10% by mass or more, 20% by mass or more, 50% by mass or more, 70% by mass or more, or 90% by mass or more. From the viewpoint of further improving affinity with the solvent when the electrolyte composition contains a solvent, the content of the first structural unit is, based on the total amount of the structural units constituting the polymer, preferably 98% by mass or less, 95% by mass or less, or 90% by mass or less.

From the viewpoint of further improving affinity with the solvent when the electrolyte composition contains a solvent, the content of the second structural unit is, based on the total content of the first structural unit and the second structural unit, preferably 1% by mass or more, 3% by mass or more, or 4% by mass or more. From the viewpoint of further improving strength when the electrolyte composition is formed into a sheet, the content of the second structural unit is, based on the total content of the first structural unit and the second structural unit, preferably 50% by mass or less, 40% by mass or less, 30% by mass or less, 20% by mass or less, 10% by mass or less, or 5% by mass or less.

From the viewpoint of further improving affinity with the solvent when the electrolyte composition contains a solvent, the content of the second structural unit is, based on the total amount of the structural units constituting the polymer, preferably 1% by mass or more, 3% by mass or more, or 5% by mass or more. From the viewpoint of further improving strength when the electrolyte composition is formed into a sheet, the content of the second structural unit is, based on the total amount of the structural units constituting the polymer, preferably 50% by mass or less, 40% by mass or less, 30% by mass or less, 20% by mass or less, or 10% by mass or less.

In the one or two or more polymers, the mass ratio of the content of the first structural unit to the content of the second structural unit (first structural unit content (mass)/second structural unit content (mass)) is 50/50 or more. The mass ratio of the content of the first structural unit to the content of the second structural unit is preferably 60/40 or more, 70/30 or more, 80/20 or more, 85/15 or more, 90/10 or more, 93/7 or more, or 95/5 or more. The mass ratio of the content of the first structural unit to the content of the second structural unit may be 99/1 or less, 97/3 or less, or 95/5 or less.

From the viewpoint of improving the conductivity of the electrolyte composition, the content of the one or two or more polymers is more than 90% by mass based on the total amount of polymer contained in the electrolyte composition. The content of the one or two or more polymers is, based on the total amount of polymer contained in the electrolyte composition, preferably 92% by mass or more, more preferably 94% by mass or more, and further preferably 96% by mass or more. The polymer contained in the electrolyte composition may consist of only the one or two or more polymers.

From the viewpoint of further improving strength when the electrolyte composition is formed into a sheet, the polymer content is, based on the total amount of the electrolyte composition, preferably 3% by mass or more, more preferably 5% by mass or more, further preferably 10% by mass or more, particularly preferably 20% by mass or more, and most preferably 25% by mass or more. From the viewpoint of further improving conductivity, the polymer content is, based on the total amount of the electrolyte composition, preferably 60% by mass or less, more preferably 50% by mass, further preferably 40% by mass or less, particularly preferably 30% by mass or less, and most preferably 28% by mass or less.

From the viewpoint of achieving both strength and conductivity when the electrolyte composition is formed into a sheet, the content of the polymer is, based on the total amount of the electrolyte composition, preferably 3 to 60% by mass, 3 to 50% by mass, 3 to 40% by mass, 3 to 30% by mass, 3 to 28% by mass, 5 to 60% by mass, 5 to 50% by mass, 5 to 40% by mass, 5 to 30% by mass, 5 to 28% by mass, 10 to 60% by mass, 10 to 50% by mass, 10 to 40% by mass, 10 to 30% by mass, 10 to 28% by mass, 20 to 60% by mass, 20 to 50% by mass, 20 to 40% by mass, 20 to 30% by mass, 20 to 28% by mass, 25 to 60% by mass, 25 to 50% by mass, 25 to 40% by mass, 25 to 30% by mass, or 25 to 28% by mass.

Since the polymer according to the present embodiment has excellent affinity with the solvent included in the electrolyte composition, the polymer retains the electrolyte in the solvent. As a result of this, the leakage of the solvent when a load is applied on the electrolyte composition is suppressed.

The oxide particles are, for example, particles of an inorganic oxide. The inorganic oxide may be an inorganic oxide containing, for example, Li, Mg, Al, Si, Ca, Ti, Zr, La, Na, K, Ba, Sr, V, Nb, B, Ge, and the like as constituent elements. The oxide particles are preferably particles of at least one selected from the group consisting of $SiO_2$, $Al_2O_3$, AOOOH, MgO, CaO, $ZrO_2$, $TiO_2$, $Li_7La_3Zr_2O_2$, and $BaTiO_3$. Since the oxide particles are polarity, the battery characteristics can be improved by promoting dissociation of the electrolyte in the electrolyte layer 7.

The oxide particles may be a rare earth metal oxide. Specifically, the oxide particles may be particles of scandium oxide, yttrium oxide, lanthanum oxide, cerium oxide, praseodymium oxide, neodymium oxide, samarium oxide, europium oxide, gadolinium oxide, terbium oxide, dysprosium oxide, holmium oxide, erbium oxide, thulium oxide, ytterbium oxide, lutetium oxide, and the like.

The specific surface area of the oxide particles is 2 to 380 $m^2/g$, and may be 5 to 100 $m^2/g$, 10 to 80 $m^2/g$, or 15 to 60 $m^2/g$. When the specific surface area is 2 to 380 $m^2/g$, a secondary battery using the electrolyte composition containing such oxide particles tends to have excellent discharge characteristics. From the same viewpoint, the specific surface area of the oxide particles may be 5 $m^2/g$ or more, 10 $m^2/g$ or more, or 15 $m^2/g$ or more, and 100 $m^2/g$ or less, 80 $m^2/g$ or less, or 60 $m^2/g$ or less. The specific surface area of the oxide particles means the specific surface area of the whole of the oxide particles, including primary particles and secondary particles, and is measured by a BET method.

From the viewpoint of further improving conductivity, the average primary particle size of the oxide particles is preferably 0.005 µm (5 nm) or more, more preferably 0.01 µm (10 nm) or more, and further preferably 0.015 µm (15 nm) or more. From the viewpoint of making the electrolyte layer 7 thin, the average primary particle size of the oxide particles is preferably 1 µm or less, more preferably 0.1 µm or less, and further preferably 0.05 µm or less. The average primary particle size of the oxide particles can be measured by a method similar to the average particle size (D50) of the positive electrode active material in a state where the particles are sufficiently crushed or dispersed. When it is difficult to crush or disperse the particles, the oxide particles may be observed with a scanning electron microscope to measure the average primary particle size by image analysis.

From the viewpoint of increasing the tensile strength when the electrolyte composition is formed into a sheet, the average primary particle size of the oxide particles is preferably 0.05 µm (50 nm) or more, more preferably 0.07 µm (70 nm) or more, further preferably 0.5 µm or more, and particularly preferably 1 µm or more, and preferably 5 µm or less, more preferably 4 µm or less, and further preferably 2 µm or less.

From the viewpoint of increasing the cross-sectional area in which the cation component of the electrolyte diffuses and further improving the conductivity, the average particle size (D50) of the oxide particles is preferably 0.001 µm or more, more preferably 0.005 µm or more, further preferably 0.05 µm or more, particularly preferably 0.1 µm or more, and most preferably 0.5 µm or more. The average particle size of the oxide particles is preferably 10 µm or less, more preferably 6 µm or less, further preferably 3 µm or less, particularly preferably 2 µm or less, and most preferably 1 µm or less. When the average particle size of the oxide particles is 6 µm or less, the electrolyte layer 7 can be suitably made thinner. More specifically, in this case, the oxide particles are less likely to aggregate, and as a result, the oxide particles can be prevented from protruding from the electrolyte layer 7 and damaging the surface of the positive electrode 6 and the surface of the negative electrode 8. In addition, since it is easier to ensure the thickness of the electrolyte layer 7, it is possible to suppress a reduction in the mechanical strength of the electrolyte layer 7. From the viewpoint of further improving conductivity by suppressing diffusion of lithium ions, the viewpoint of making the electrolyte composition thinner, and the viewpoint of suppressing protrusion of the oxide particles from the surface of the electrolyte composition, the average particle size of the oxide particles is preferably 0.001 to 10 µm; from the viewpoint of even more suitably making the electrolyte layer thinner, the average particle size of the oxide particles is more preferably 0.001 to 6 µm; and from the viewpoint of preventing liquid leakage, the average particle size of the oxide particles is further preferably 0.001 to 0.1 µm or 0.005 to 1 µm. The average particle size ($D_{50}$) of the oxide particles is measured by the same method as the average particle size ($D_{50}$) of the positive electrode active material.

The shape of the oxide particles may be, for example, a block shape or a substantially spherical shape. From the viewpoint of facilitating thinning of the electrolyte layer 7, the aspect ratio of the oxide particles is preferably 10 or less, more preferably 5 or less, and further preferably 2 or less. The aspect ratio is defined as the ratio of the length of the particles in the long axis direction (maximum length of the particles) and the length of the particles in the short axis direction (minimum length of the particles) calculated from a scanning electron micrograph of the oxide particles. The length of the particles is obtained by statistically calculating the above photograph by using commercially available image processing software (e.g., image analysis software by Asahi Kasei Engineering Corporation, AZO Kun (registered trademark)).

The oxide particles may be surface-treated with a silicon-containing compound. Specifically, the surface of the oxide particles may be bonded with the silicon atom of the silicon-containing compound via an oxygen atom. The silicon-containing compound is preferably at least one selected from the group consisting of an alkoxysilane, an epoxy group-containing silane, an amino group-containing silane, a silazane, and a siloxane.

The alkoxysilane may be methyltrimethoxysilane, dimethyldimethoxysilane, phenyltrimethoxysilane, phenyltriethoxysilane, dimethoxydiphenylsilane, n-propyltrimethoxysilane, hexyltrimethoxysilane, tetraethoxysilane, methyltriethoxysilane, dimethyldiethoxysilane, n-propyltriethoxysilane, and the like.

The epoxy group-containing silane may be 2-(3,4-epoxycyclohexyl)pethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, and the like.

The amino group-containing silane may be N-2-(aminoethyl)-3-aminopropylmethyldimethoxysilane, N-2-(aminoethyl)-3-aminopropyltrimethoxysilane, 3-aminopropyltriethoxysilane, N-phenyl-3-aminopropyltrimethoxysilane, and the like.

The silazane may be hexamethyldisilazane and the like. The siloxane may be dimethyl silicone oil and the like. These may be a silazane or siloxane having a reactive functional group (e.g., a carboxyl group) on one or both terminals thereof.

The surface-treated oxide particles may be particles produced by a known method, or a commercially available product may be used as is.

From the viewpoint of promoting dissociation of the electrolyte salt, the content of the oxide particles is, based on the total amount of the electrolyte composition, preferably 5% by mass or more, 10% by mass or more, 15% by mass or more, and 20% by mass or more. From the viewpoint of further improving conductivity, the content of the oxide particles is, based on the total amount of the electrolyte composition, preferably 50% by mass or less and more preferably 40% by mass or less. From the viewpoint of promoting dissociation of the electrolyte salt and further improving conductivity, the content of the oxide particles is, based on the total amount of the electrolyte composition, preferably 5 to 50% by mass, 5 to 40% by mass, 10 to 50% by mass, 10 to 40% by mass, 15 to 50% by mass, 15 to 40% by mass, 20 to 50% by mass, or 20 to 40% by mass.

The mass ratio of the polymer content to the oxide particle content (polymer content/oxide particle content) may be, for example, 2/3 or more, 1/1 or more, or 3/2 or more, and may be 4/1 or less, 3/1 or less, or 2/1 or less.

The electrolyte salt is at least one selected from the group consisting of a lithium salt, a sodium salt, a calcium salt, and a magnesium salt. The electrolyte salt is a compound used to exchange cations between the positive electrode 6 and the negative electrode 8.

The above-mentioned electrolyte salts are preferable in that they have a low degree of dissociation at low temperatures, easily diffuse in solvents, and do not thermally decompose at high temperatures, and therefore the environmental temperature at which the secondary battery can be used is wide. The electrolyte salt may be an electrolyte salt used in a fluorine ion battery.

The anion of the electrolyte salt may be a halide ion ($I^-$, $Cl^-$, $Br^-$, etc.), $SCN^-$, $BF_4^-$, $BF_3(CF_3)^-$, $BF_3(C_2F_5)^-$, $PF_6^-$, $ClO_4^-$, $SbF_6^-$, $N(SO_2F)_2^-$, $N(SO_2CF_3)_2^-$, $N(SO_2C_2F_5)_2^-$, $B(C_6H_5)_4^-$, $B(O_2C_2H_4)_2^-$, $C(SO_2F)_3^-$, $C(SO_2CF_3)_3^-$, $CF_3COO^-$, $CF_3SO_2O^-$, $C_6F_5SO_2O^-$, $B(O_2C_2O_2)_2^{-1}$, or the like. The anion is preferably $PF_6^-$, $BF_4^-$, $N(SO_2F)_2^-$, $N(SO_2CF_3)_2^-$, $B(O_2C_2O_2)_2^-$, or $ClO_4^-$.

In the below description, the following abbreviations may be used.

[FSI]$^-$: $N(SO_2F)_2^-$, bis(fluorosulfonyl)imide anion
[TFSI]$^-$: $N(SO_2CF_3)_2^-$, bis(trifluoromethanesulfonyl)imide anion
[BOB]$^-$: $B(O_2C_2O_2)_2^-$, bisoxalate borate anion
[f3C]$^-$: $C(SO_2F)_3^-$, tris(fluorosulfonyl)carbanion The lithium salt may be at least one selected from the group consisting of $LiPF_6$, $LiBF_4$, Li[FSI], Li[TFSI], Li[f3C], Li[BOB], $LiCl_4$, $LiBF_3(CF_3)$, $LiBF_3(C_2F_5)$, $LiBF_3(C_3F_7)$, $LiBF_3(C_4F_9)$, $LiC(SO_2CF_3)_3$, $LiCF_3SO_2O$, $LiCF_3COO$, and LiRCOO wherein R is an alkyl group having 1 to 4 carbon atoms, a phenyl group, or a naphthyl group.

The sodium salt may be at least one selected from the group consisting of $NaPF_6$, $NaBF_4$, Na[FSI], Na[TFSI], Na[f3C], Na[BOB], $NaClO_4$, $NaBF_3(CF_3)$, $NaBF_3(C_2F_5)$, $NaBF_3(C_3F_7)$, $NaBF_3(C_4F_9)$, $NaC(SO_2CF_3)_3$, $NaCF_3SO_2O$, $NaCF_3COO$, and NaRCOO wherein R is an alkyl group having 1 to 4 carbon atoms, a phenyl group, or a naphthyl group.

The calcium salt may be at least one selected from the group consisting of $Ca(PF_6)_2$, $Ca(BF_4)_2$, Ca[FSI]$_2$, Ca[TFSI]$_2$, Ca[f3C]$_2$, Ca[BOB]$_2$, $Ca(ClO)_2$, Ca[BF$_3$(CF$_3$)]$_2$, Ca[BF$_3$(C$_2$F$_5$)]$_2$, Ca[BF$_3$(C$_3$F$_7$)]$_2$, Ca[BF$_3$(C$_4$F$_9$)]$_2$, Ca[C(SO$_2$CF$_3$)$_3$]$_2$, $Ca(CF_3SO_2O)_2$, $Ca(CF_3COO)_2$, and $Ca(RCOO)_2$ wherein R is an alkyl group having 1 to 4 carbon atoms, a phenyl group, or a naphthyl group.

The magnesium salt may be at least one selected from the group consisting of $Mg(PF_6)_2$, $Mg(BF_4)_2$, Mg[FSI]$_2$, Mg[TFSI]$_2$, Mg[f3C]$_2$, Mg[BOB]$_2$, $Mg(ClO_4)_2$, Mg[BF$_3$(CF$_3$)]$_2$, Mg[BF$_3$(C$_2$F$_5$)]$_2$, Mg[BF$_3$(C$_3$F$_7$)]$_2$, Mg[BF$_3$(C$_4$F$_9$)]$_2$, Mg[C(SO$_2$CF$_3$)$_3$]$_2$, $Mg(CF_3SO_3)_2$, $Mg(CF_3COO)_2$, and $Mg(RCOO)_2$ wherein R is an alkyl group having 1 to 4 carbon atoms, a phenyl group, or a naphthyl group.

Among these, from the viewpoint of dissociation and electrochemical stability, the electrolyte salt is preferably at least one selected from the group consisting of $LiPF_6$, $LiBF_4$, Li[FSI], Li[TFSI], Li[f3C], Li[BOB], $LiClO_4$, $LiBF_3(CF_3)$, $LiBF_3(C_2F_5)$, $LiBF_3(C_3F_7)$, $LiBF_3(C_4F_9)$, $LiC(SO_2CF_3)_3$, $LiCF_3SO_2O$, $LiCF_3COO$, and LiRCOO wherein R is an alkyl group having 1 to 4 carbon atoms, a phenyl group, or a naphthyl group, and more preferably is at least one selected from the group consisting of Li[TFSI], Li[FSI], $LiPF_6$, $LiBF_4$, Li[BOB], and $LiClO_4$, and further preferably at least one selected from the group consisting of Li[TFSI], Li[FSI].

In order to suitably produce the electrolyte layer 7, the electrolyte salt content may be, based on the total amount of the electrolyte composition, 10% by mass or more and 60% by mass or less. The content of the electrolyte salt is preferably 20% by mass or more from the viewpoint of further increasing the conductivity of the electrolyte layer, and more preferably 30% by mass or more from the viewpoint of enabling charging/discharging of the lithium secondary battery at a high load factor.

The solvent preferably has a low vapor pressure and does not combust easily.

The solvent may be a glyme represented by the following formula (1).

 (1)

In formula (1), $R^1$ and $R^2$ each independently represent an alkyl group having 4 or less carbon atoms or a fluoroalkyl group having 4 or less carbon atoms, k represents an integer of 1 to 6. $R^1$ and $R^2$ are each independently preferably a methyl group or an ethyl group.

Specifically, the glyme may be monoglyme (k=1), diglyme (k=2), triglyme (k=3), tetraglyme (k=4), pentaglyme (k=5), or hexaglyme (k=6).

When the electrolyte composition contains a glyme as a solvent, a part or all of the glyme may form a complex with the electrolyte salt.

The solvent may also be an ionic liquid. The ionic liquid contains the following anion component and cation component. Note that the ionic liquid in the present embodiment is a liquid substance at −20° C. or higher.

The anion component of the ionic liquid is not particularly limited, and may be a halogen anion such as $Cl^-$, $Br^-$, $I^-$, an inorganic anion such as $BF_4^-$, $N(SO_2F)_2^-$, an organic anion such as $B(C_6H_5)_4^-$, $CH_3SO_3^-$, $CF_3SO_3^-$, $N(C_4F_9SO_2)_2^-$, $N(SO_2CF_3)_2^-$, $N(SO_2C_4F_9)_2^-$, or the like. The anion component of the ionic liquid preferably contains at least one selected from the group consisting of $B(C_6H_5)_4^-$, $CH_3SO_3^-$, $N(SO_2C_4F_9)_2$, $CF_3SO_2O^-$, $N(SO_2F)_2^-$, $N(SO_2CF_3)_2^-$, and $N(SO_2C_2F_5)_2^-$; from the viewpoint of having a relatively low viscosity, further improving ionic conductivity, and further improving charge/discharge characteristics, it is more preferable to contain at least one selected from the group consisting of $N(C_4F_9SO_2)_2^-$, $CF_3SO_3^-$, $N(SO_2F)_2^-$, $N(SO_2CF_3)_2$, and $N(SO_2CF_2CF_3)_2$, and further preferably $N(SO_2F)_2^-$.

The anion component of the ionic liquid may contain at least one anion component represented by the following formula (2).

$$N(SO_2C_mF_{2m+1})(SO_2C_nF_{2n+1})^- \quad (2)$$

m and n each independently represent an integer of 0 to 5. m and n may be the same or different from each other, and are preferably the same as each other.

Examples of the anion component represented by formula (2) include $N(SO_2C_4F_9)_2^-$, $N(SO_2F)_2^-$, $N(SO_2CF_3)_2^-$, and $N(SO_2C_2F_5)_2^-$.

The cation component of the ionic liquid is not particularly limited, but is preferably at least one selected from the group consisting of a chain-like quaternary onium cation, a piperidinium cation, a pyrrolidinium cation, a pyridinium cation, and an imidazolium cation.

The chain-like quaternary onium cation is, for example, a compound represented by the following formula (3).

 (3)

wherein $R^3$ to $R^6$ each independently represent a chain-like alkyl group having 1 to 20 carbon atoms, or a chain-like alkoxyalkyl group represented by R—O—$(CH_2)_n$— wherein R represents a methyl group or an ethyl group, n represents an integer of 1 to 4, and X represents a nitrogen atom or a phosphorus atom; and the number of carbon atoms of the alkyl group represented by $R^3$ to $R^6$ is preferably 1 to 20, more preferably 1 to 10, and further preferably 1 to 5.

The piperidinium cation is, for example, a nitrogen-containing six-membered cyclic compound represented by the following formula (4).

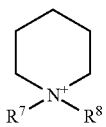 (4)

wherein $R^7$ and $R^8$ each independently represent an alkyl group having 1 to 20 carbon atoms, or an alkoxyalkyl group represented by R—O—$(CH_2)_n$— wherein R represents a methyl group or an ethyl group, and n represents an integer of 1 to 4; and the number of carbon atoms of the alkyl group represented by $R^7$ and $R^8$ is preferably 1 to 20, more preferably 1 to 10, and further preferably 1 to 5.

The pyrrolidinium cation is, for example, a five-membered cyclic compound represented by the following formula (5).

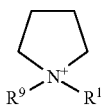 (5)

wherein $R^9$ and $R^{10}$ each independently represent an alkyl group having 1 to 20 carbon atoms, or an alkoxyalkyl group represented by R—O—$(CH_2)_n$— wherein R represents a methyl group or an ethyl group, and n represents an integer of 1 to 4; and the number of carbon atoms of the alkyl group represented by $R^9$ and $R^{10}$ is preferably 1 to 20, more preferably 1 to 10, and further preferably 1 to 5.

The pyridinium cation is, for example, a compound represented by the following formula (6).

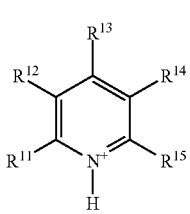 (6)

wherein $R^{11}$ to $R^{15}$ each independently represent an alkyl group having 1 to 20 carbon atoms, an alkoxyalkyl group represented by R—O—$(CH_2)_n$— wherein R represents a methyl group or an ethyl group, and n represents an integer of 1 to 4, or a hydrogen atom; and the number of carbon atoms of the alkyl group represented by $R^{11}$ to $R^{15}$ is preferably 1 to 20, more preferably 1 to 10, and further preferably 1 to 5.

The imidazolium cation is, for example, a compound represented by the following formula (7).

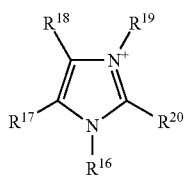

(7)

wherein $R^{16}$ to $R^{20}$ each independently represent an alkyl group having 1 to 20 carbon atoms, an alkoxyalkyl group represented by $R-O-(CH_2)_n-$ wherein R represents a methyl group or an ethyl group, and n represents an integer of 1 to 4, or a hydrogen atom; and the number of carbon atoms of the alkyl group represented by $R^{16}$ to $R^{20}$ is preferably 1 to 20, more preferably 1 to 10, and further preferably 1 to 5.

More specifically, the ionic liquid may be N,N-diethyl-N-methyl-N-(2-methoxyethyl)ammonium-bis(trifluoromethanesulfonyl)imide (DEME-TFSI), N,N-diethyl-N-methyl-N-(2-methoxyethyl)ammonium-bis(fluorosulfonyl)imide (DEME-FSI), 1-ethyl-3-methylimidazolidium-bis(trifluoromethanesulfonyl)imide (EMI-TFSI), 1-ethyl-3-methylimidazolidium-bis(fluorosulfonyl)imide (EMI-FSI), N-methyl-N-propylpyrrolidinium-bis(trifluoromethanesulfonyl)imide (Py13-TFSI), N-methyl-N-propylpyrrolidinium-bis(fluorosulfonyl)imide (Py13-FSI), N-ethyl-N-methylpyrrolidinium-bis(trifluoromethanesulfonyl)imide (Py12-TFSI), N-ethyl-N-methylpyrrolidinium-bis(fluorosulfonyl)imide (Py12-FSI), or 1-ethyl-3-methylimidazolium dicyanamide (EMI-DCA).

The electrolyte composition may contain, as a solvent, for the purpose of further improving the conductivity, a non-aqueous solvent such as ethylene carbonate, propylene carbonate, butylene carbonate, vinylene carbonate, γ-butyrolactone, diethyl carbonate, methyl ethyl carbonate, 1,2-dimethoxyethane, 2-methyltetrahydrofuran, dimethyl sulfoxide, 1,3-dioxolane, formamide, dimethylformamide, methyl propionate, ethyl propionate, phosphoric acid triester, trimethoxymethane, dioxolane, diethyl ether, sulfolane, 3-methyl-2-oxazolidinone, tetrahydrofuran, 1,2-diethoxyethane, chloroethylene carbonate, and chloropropylene carbonate. From the viewpoint of improving safety, the electrolyte composition preferably contains only at least one solvent selected from the above-mentioned glymes and ionic liquids as a solvent.

From the viewpoint of suitably producing the electrolyte layer, the content of the solvent may be, based on the total amount of the electrolyte composition, 10 to 80% by mass, or 10 to 60% by mass or less. From the viewpoint of suppressing a reduction in the strength of the electrolyte layer, the content of the solvent is preferably 80% by mass or less based on the total amount of the electrolyte layer. From the viewpoint of increasing the conductivity of the electrolyte membrane by increasing the electrolyte salt content to thereby enable charging/discharging of the lithium secondary battery at a high load factor, the content of the solvent may be, based on the total amount of the electrolyte composition, 40% by mass or less, or 30% by mass or less.

From the viewpoint of further improving the conductivity and suppressing a reduction in the capacity of the secondary battery, the total content of the electrolyte salt and the solvent (e.g., glyme such as tetraglyme or ionic liquid) is, based on the total amount of the electrolyte composition, preferably 10% by mass or more, more preferably 25% by mass or more, and further preferably 40% by mass or more.

From the viewpoint of suppressing a reduction in the strength of the electrolyte composition, the total content of the electrolyte salt and the solvent is preferably 80% by mass or less and more preferably 70% by mass or less. From the viewpoint of further improving the conductivity and suppressing a reduction in the capacity of the secondary battery and the strength of the electrolyte composition, the total content of the electrolyte salt and the solvent is, based on the total amount of the electrolyte composition, preferably 10 to 80% by mass, 10 to 70% by mass, 25 to 80% by mass, 25 to 70% by mass, 40 to 80% by mass, or 40 to 70% by mass.

In the electrolyte composition, from the viewpoint of further improving charge/discharge characteristics, the concentration of the electrolyte salt per unit volume of the solvent is preferably 0.5 mol/L or more, more preferably 0.7 mol/L or more, further preferably 0.8 mol/L or more, and preferably 2.0 mol/L or less, more preferably 1.8 mol/L or less, and further preferably 1.5 mol/L or less.

The mass ratio of the electrolyte content to the electrolyte support material content (electrolyte content/electrolyte support material content) may be, from the viewpoint of suppressing leakage of the electrolyte composition, ¼ or more or ⅔ or more, and ¾ or less, ½ or less, or ¼ or less.

The thickness of the electrolyte layer 7 is preferably 5 μm or more and more preferably 10 μm or more from the viewpoint of increasing conductivity and improving strength. From the viewpoint of suppressing the resistance of the electrolyte layer 7, the thickness of the electrolyte layer 7 is preferably 200 μm or less, more preferably 150 μm or less, further preferably 100 μm or less, and particularly preferably 50 μm or less.

Next, a method of manufacturing the secondary battery 1 described above is described. The manufacturing method of the secondary battery 1 according to the present embodiment includes a first step of forming the positive electrode mixture layer 10 on the positive electrode current collector 9 to obtain the positive electrode 6, a second step of forming the negative electrode mixture layer 12 on the negative electrode current collector 11 to obtain the negative electrode 8, and a third step of disposing the electrolyte layer 7 between the positive electrode 6 and the negative electrode 8.

In the first step, the positive electrode 6 is obtained by, for example, dispersing the material to be used for the positive electrode mixture layer in a dispersion medium using a kneading machine, a dispersing machine, or the like to obtain a slurry-like positive electrode mixture, then coating the positive electrode current collector 9 with the positive electrode mixture by a doctor blade method, a dipping method, a spray method or the like, and then volatilizing the dispersion medium. After volatilizing the dispersion medium, a compression molding step using a roll press may be optionally carried out. The positive electrode mixture layer 10 may be formed as a positive electrode mixture layer having a multilayer structure by performing the above-mentioned steps from coating with the positive electrode mixture to volatilization of the dispersion medium a plurality of times.

The dispersion medium used in the first step may be water, 1-methyl-2-pyrrolidone (hereinafter also referred to as NMP), or the like. The dispersion medium is a compound other than the above-mentioned solvent.

When the positive electrode mixture layer 10 includes the positive electrode active material, the conductive agent, the binder, the electrolyte salt, and the solvent, the mixing ratio of the positive electrode active material, the conductive agent, the binder, and the solvent in which the electrolyte salt is dissolved may be, for example, positive electrode active material:conductive agent:binder:solvent in which electrolyte salt is dissolved=69 to 82:0.1 to 10:1 to 12:10 to 17 (mass ratio). However, the ratio is not necessarily limited to this range.

In the second step, the method of forming the negative electrode mixture layer 12 on the negative electrode current collector 11 may be the same method as the first step described above.

When the negative electrode mixture layer 12 includes the negative electrode active material, the conductive agent, the binder, the electrolyte salt, and the solvent, the mixing ratio of the negative electrode active material, the conductive agent, the binder, and the solvent in which the electrolyte salt is dissolved may be, for example, negative electrode active material:conductive agent:binder:ionic liquid in which electrolyte salt is dissolved=69 to 82:0.1 to 10:1 to 12:10 to 17 (mass ratio). However, the ratio is not necessarily limited to this range.

Figure 4:
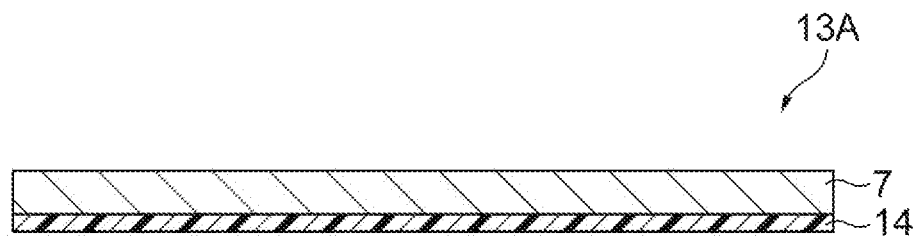
FIG. 4(a) is a schematic cross-sectional view illustrating an electrolyte sheet according to one embodiment.
FIG. 4(b) is a schematic cross-sectional view illustrating an electrolyte sheet according to another embodiment.
Figure 4:
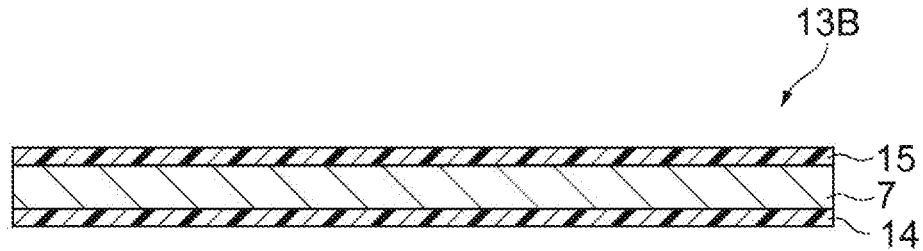

In the third step, in one embodiment, the electrolyte layer 7 is formed, for example, by manufacturing an electrolyte sheet provided with an electrolyte composition on a substrate. FIG. 4(a) is a schematic cross-sectional view illustrating an electrolyte sheet according to an embodiment. As illustrated in FIG. 4(a), an electrolyte sheet 13A includes a substrate 14 and an electrolyte layer 7 provided on the substrate 14.

The electrolyte sheet 13A is manufactured, for example, by dispersing a material (solid content) used for the electrolyte layer 7 in a dispersion medium to obtain a slurry, then coating the substrate 14 with the slurry and volatilizing the dispersion medium. The dispersion medium is preferably water, NMP, toluene, or the like.

The substrate 14 has heat resistance capable of withstanding the heating when the dispersion medium is volatilized, and is not limited as long as it does not react with the electrolyte composition and is not caused to swell by the electrolyte composition, and is formed, for example of a resin. Specifically, the substrate 14 may be a film consisting of a resin (general-purpose engineering plastic) such as polyethylene terephthalate, polytetrafluoroethylene, polyimide, polyethersulfone, polyetherketone, and the like.

The substrate 14 only needs to have a heat-resistant temperature that is capable of withstanding the processing temperature for volatilizing the dispersion medium in the process of producing the electrolyte layer. When the substrate 14 is formed of a resin, the heat-resistant temperature is a lower temperature than the softening point (temperature at which plastic deformation starts) or the melting point of the substrate 14. The heat-resistant temperature of the substrate 14 may be, from the viewpoint of compatibility with the solvent used for the electrolyte layer 7, preferably 50° C. or higher, more preferably 100° C. or higher, and further preferably 150° C. or higher, and for example, 400° C. or lower. When a substrate having the above heat-resistant temperature is used, a dispersion medium (NMP, toluene, etc.) such as described above can be suitably used.

The thickness of the substrate 14 is preferably as thin as possible while maintaining a strength capable of withstanding the tensile force of the coating apparatus. From the viewpoint of securing strength when the substrate 14 is coated with the electrolyte composition while reducing the volume of the entire electrolyte sheet 13A, the thickness of the substrate 14 is preferably 5 µm or more, more preferably 10 µm or more, and further preferably 25 µm or more, and preferably 100 µm or less, more preferably 50 µm or less, and further preferably 40 µm or less.

The electrolyte sheet can also be manufactured continuously while being rolled into a roll shape. In that case, the electrolyte layer 7 may be damaged as a result of the surface of the electrolyte layer 7 coming into contact with the back surface of the substrate 14 and a part of the electrolyte layer 7 sticking to the substrate 14. In order to prevent such a situation, as another embodiment, the electrolyte sheet may be provided with a protective material on the side opposite to the substrate 14 of the electrolyte layer 7. FIG. 4(b) is a schematic cross-sectional view illustrating an electrolyte sheet according to another embodiment. As illustrated in FIG. 4(b), an electrolyte sheet 13B further includes a protective material 15 on the opposite side of the electrolyte layer 7 from the substrate 14.

The protective material 15 may be any material that can be easily peeled off from the electrolyte layer 7; the protective material 15 is preferably a nonpolar resin film such as polyethylene, polypropylene, or polytetrafluoroethylene. When a nonpolar resin film is used, the electrolyte layer 7 and the protective material 15 do not stick to each other, and the protective material 15 can be easily peeled off.

From the viewpoint of ensuring strength while reducing the volume of the entire electrolyte sheet 13B, the thickness of the protective material 15 is preferably 5 µm or more, more preferably 10 µm, and preferably 100 µm or less, more preferably 50 µm or less, and further preferably 30 µm or less.

The heat-resistant temperature of the protective material 15 is, from the viewpoint of suppressing deterioration in a low temperature environment and suppressing softening in a high temperature environment, preferably −30° C. or higher and more preferably 0° C. or higher, and preferably 100° C. or lower and more preferably 50° C. or lower. When the protective material 15 is provided, it is not necessary to increase the heat-resistant temperature because the above-mentioned step of volatilizing the dispersion medium is not essential.

As a method of providing the electrolyte layer 7 between the positive electrode 6 and the negative electrode 8 using the electrolyte sheet 13A, for example, the substrate 14 is peeled from the electrolyte sheet 13A, and the positive electrode 6, the electrolyte layer 7, and the negative electrode 8 are stacked by, for example, lamination to obtain the secondary battery 1. At this time, the electrolyte layer 7 is positioned on the positive electrode mixture layer 10 side of the positive electrode 6 and on the negative electrode mixture layer 12 side of the negative electrode 8, that is, the positive electrode current collector 9, the positive electrode mixture layer 10, the electrolyte layer 7, the negative electrode mixture layer 12, and the negative electrode current collector 11 are stacked in that order.

Second Embodiment

Figure 5:
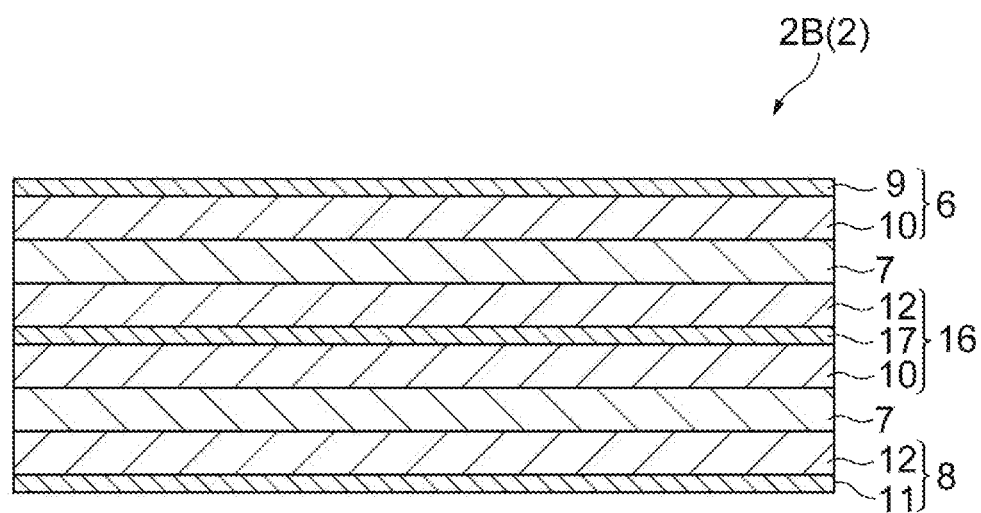
FIG. 5 is a schematic cross-sectional view illustrating an embodiment of an electrode group in a secondary battery according to a second embodiment.

Next, a secondary battery according to a second embodiment will be described. FIG. 5 is a schematic cross-sectional view illustrating an embodiment of an electrode group in the secondary battery according to the second embodiment. As illustrated in FIG. 5, the secondary battery of the second embodiment is different from the secondary battery of the first embodiment in that an electrode group 2B includes a bipolar electrode 16. Specifically, the electrode group 2B includes the positive electrode 6, a first electrolyte layer 7, a bipolar electrode 16, a second electrolyte layer 7, and the negative electrode 8 in this order.

The bipolar electrode 16 includes a bipolar electrode current collector 17, the positive electrode mixture layer 10 provided on the negative electrode 8 side (positive electrode surface) of a bipolar electrode current collector 17, and the negative electrode mixture layer 12 provided on a surface on the positive electrode 6 side (negative electrode surface) of a bipolar electrode current collector 17.

In the bipolar current collector 17, it is preferable that the positive electrode surface be formed of a material with excellent oxidation resistance, and may be formed of aluminum, stainless steel, titanium, or the like. The negative electrode surface in the bipolar current collector 17 in which graphite or an alloy is used as the negative electrode active material may be formed of a material that does not form an alloy with lithium, specifically, stainless steel, nickel, iron, titanium, or the like. When different metals are used for the positive electrode surface and the negative electrode surface, the bipolar current collector 17 may be a cladding material in which different metal foils are laminated. However, when a negative electrode 8 operating at a potential at which an alloy with lithium does not form, such as lithium titanate, is used, the above-mentioned limitation does not exist, and the negative electrode surface may be the same material as the positive electrode current collector 9. In that case, the bipolar current collector 17 may be a single metal foil. The bipolar current collector 17 as a single metal foil may be an aluminum perforated foil having holes with a hole diameter of 0.1 to 10 mm, an expanded metal, a foam metal plate, or the like. In addition to the above, the bipolar current collector 17 may be formed of any material as long as it does not cause changes such as dissolution and oxidation during use of the battery; and the shape, production method, and the like of the bipolar current collector 17 are not limited.

The thickness of the bipolar current collector 17 may be 10 µm or more and 100 µm or less; from the viewpoint of reducing the volume of the overall positive electrode, the thickness is preferably 10 µm or more and 50 µm or less; and from the viewpoint of winding the bipolar electrode with a small curvature when forming the battery, the thickness is more preferably 10 µm or more and 20 µm or less.

Next, a method of manufacturing the secondary battery according to the second embodiment will be described. The manufacturing method of the secondary battery according to the present embodiment includes a first step of forming the positive electrode mixture layer 10 on the positive electrode current collector 9 to obtain the positive electrode 6, a second step of forming the negative electrode mixture layer 12 on the negative electrode current collector 11 to obtain the negative electrode 8, a third step of forming the positive electrode mixture layer 10 on one side of the bipolar current collector 17 and the negative electrode mixture layer 12 on the other side to obtain the bipolar electrode 16, and a fourth step of disposing the electrolyte layer 7 between the positive electrode 6 and the bipolar electrode 16 and between the negative electrode 8 and the bipolar electrode 16.

The first step and the second step may be the same methods as the first step and the second step in the first embodiment.

In the third step, the method of forming the positive electrode mixture layer 10 on one surface of the bipolar current collector 17 may be the same method as the first step in the first embodiment. The method of forming the negative electrode mixture layer 12 on the other surface of the bipolar current collector 17 may be the same method as the second step in the first embodiment.

As the method of disposing the electrolyte layer 7 between the positive electrode 6 and the bipolar electrode 16 in the fourth step, in one embodiment, for example, the electrolyte layer 7 is formed by producing an electrolyte sheet having an electrolyte composition on a substrate. The manufacturing method of the electrolyte sheet may be the same method as the manufacturing method of the electrolyte sheets 13A and 13B in the first embodiment.

In the fourth step, the method of disposing the electrolyte layer 7 between the negative electrode 8 and the bipolar electrode 16 may be the same as the method of disposing the electrolyte layer 7 between the positive electrode 6 and the bipolar electrode 16 described above.

EXAMPLES

Hereinafter, the present invention will be described more specifically with reference to Examples. However, the present invention is not limited to these Examples.

Test Example 1

Example 1-1

A slurry containing an electrolyte composition was prepared by dispersing in an NMP, which is a dispersion medium, 26% by mass of a copolymer of vinylidene fluoride and hexafluoropyrene (vinylidene fluoride/hexafluoropyrene (mass ratio)=95/5, hereinafter also referred to as PVDF-HFP) as a polymer, 13% by mass of $SiO_2$ particles (average particle size 0.1 µm) as oxide particles, 34.5% by mass of lithium bis(fluorosulfonyl)imide (Li[FSI]) as an electrolyte salt, and 26.5% by mass of tetraglyme as a solvent. A polyethylene terephthalate substrate was coated with the obtained slurry, and heated to volatilize the dispersion medium to obtain an electrolyte sheet. The thickness of the electrolyte layer in the obtained electrolyte sheet was 25±2 µm.

Examples 1-2 to 1-4

Electrolyte sheets were manufactured in the same manner as in Example 1, except that the content of each material in the electrolyte sheet of Example 1 was changed to the content shown in Table 1.

Example 1-5

An electrolyte sheet was manufactured in the same manner as in Example 1, except that the content of the oxide particles was increased and the total content of the electrolyte salt and the solvent ((A)+(B) in Table 1) was decreased from that in the electrolyte sheet of Example 1.

Examples 1-6 to 1-13

Electrolyte sheets were manufactured in the same manner as in Example 1, except that the type of the oxide particles in the electrolyte sheet of Example 1 was changed to the type shown in Tables 1 to 2.

Examples 1-14 to 1-16

Electrolyte sheets were manufactured in the same manner as in Example 1, except that the average particle size of the $SiO_2$ particles as oxide particles in the electrolyte sheet of Example 1 was changed to the average particle size shown in Table 2.

Examples 1-17 to 1-18

Electrolyte sheets were manufactured in the same manner as in Example 1, except that the content of hexafluoropropylene in the polymer in the electrolyte sheet of Example 1 was changed to the content shown in Table 2.

Examples 1-19 to 1-22

Electrolyte sheets were manufactured in the same manner as in Example 1, except that the solvent in the electrolyte sheet of Example 1 was changed to the solvent shown in Tables 2 to 3. In Table 3, the EMI-TFSI (EMI-BTI) of Example 1-21 represents 1-ethyl-3-methylimidazolidium-bis(trifluoromethanesulfonyl)imide [CAS No. 174899-82-2], and the EMI-DCA of Example 1-22 represents 1-ethyl-3-methylimidazolium dicyanamide [CAS No. 370865-89-7].

Examples 1-23 to 1-30

Electrolyte sheets were manufactured in the same manner as in Example 1, except that the type of polymer in the electrolyte sheet of Example 1 was changed to type shown in Table 3. In Table 3, the abbreviations of the polymers represent the polymers described in the following, and polymer mixing ratio means mass ratio.
PVDF+PA: Mixture of polyvinylidene fluoride and polyacrylic acid
PVDF-MA: Copolymer of vinylidene fluoride and maleic acid
PTFE+PMMA: Mixture of polytetrafluoroethylene and polymethyl methacrylate
PVDF+PMMA: Mixture of polyvinylidene fluoride and polymethyl methacrylate
PVDF-HFP+PMMA: Mixture of a copolymer of vinylidene fluoride and hexafluoropyrene with polymethyl methacrylate
PVDF-HFP+PAN: Mixture of a copolymer of vinylidene fluoride and hexafluoropyrene with polyacrylonitrile
PVDF-HFP+PVC: Mixture of a copolymer of vinylidene fluoride and hexafluoropyrene with polyvinyl chloride Comparative Example 1-1

An electrolyte sheet was manufactured in the same manner as in Example 1, except that oxide particles were not used in the electrolyte sheet of Example 1-1.

Comparative Examples 1-2 to 1-8

Electrolyte sheets were manufactured in the same manner as in Example 1, except that the type and/or mixing ratio of the polymer in the electrolyte sheet of Example 1-1 was changed to those shown in Table 4. In Table 4, the abbreviations of the polymers represent the polymers described in the following, and polymer mixing ratio means mass ratio.
PVDF: Polyvinylidene fluoride
PVDF-HFP+PAN+PVC: Mixture of a copolymer of vinylidene fluoride and hexafluoropyrene with polyacrylonitrile and polyvinyl chloride

TABLE 1

| | Polymer | | | Oxide Particles | | Electrolyte | Solvent | | |
| --- | --- | --- | --- | --- | --- | --- | --- | --- | --- |
| | Polymer Type (mass ratio of structural units) | Polymer Mixing Ratio | Content (% by mass) | Particle Type (average particle size μm) | Content (% by mass) | Salt Content (% by mass) (A) | Solvent Type | Content (% by mass) (B) | (A) + (B) |
| Example 1-1 | PVDF-HFP (95/5) | — | 26 | $SiO_2$ (0.1) | 13 | 34.5 | tetraglyme | 26.5 | 61 |
| Example 1-2 | PVDF-HFP (95/5) | — | 30 | $SiO_2$ (0.1) | 15 | 31.1 | tetraglyme | 23.9 | 55 |
| Example 1-3 | PVDF-HFP (95/5) | — | 36 | $SiO_2$ (0.1) | 18 | 26 | tetraglyme | 20 | 46 |
| Example 1-4 | PVDF-HFP (95/5) | — | 13 | $SiO_2$ (0.1) | 26 | 34.5 | tetraglyme | 26.5 | 61 |
| Example 1-5 | PVDF-HFP (95/5) | — | 26 | $SiO_2$ (0.1) | 18 | 31.6 | tetraglyme | 24.4 | 56 |
| Example 1-6 | PVDF-HFP (95/5) | — | 26 | $Al_2O_3$ (0.1) | 13 | 34.5 | tetraglyme | 26.5 | 61 |
| Example 1-7 | PVDF-HFP (95/5) | — | 26 | AlOOH (0.1) | 13 | 34.5 | tetraglyme | 26.5 | 61 |
| Example 1-8 | PVDF-HFP (95/5) | — | 26 | MgO (0.1) | 13 | 34.5 | tetraglyme | 26.5 | 61 |
| Example 1-9 | PVDF-HFP (95/5) | — | 26 | CaO (0.1) | 13 | 34.5 | tetraglyme | 26.5 | 61 |
| Example 1-10 | PVDF-HFP (95/5) | — | 26 | $ZrO_2$ (0.1) | 13 | 34.5 | tetraglyme | 26.5 | 61 |

TABLE 2

| | Polymer | | | Oxide Particles | | Electrolyte | Solvent | | |
| --- | --- | --- | --- | --- | --- | --- | --- | --- | --- |
| | Polymer Type (mass ratio of structural units) | Polymer Mixing Ratio | Content (% by mass) | Particle Type (average particle size μm) | Content (% by mass) | Salt Content (% by mass) (A) | Solvent Type | Content (% by mass) (B) | (A) + (B) |
| Example 1-11 | PVDF-HFP (95/5) | — | 26 | $TiO_2$ (0.1) | 13 | 34.5 | tetraglyme | 26.5 | 61 |
| Example 1-12 | PVDF-HFP (95/5) | — | 26 | $Li_7La_3Zr_2O_{12}$ (0.1) | 13 | 34.5 | tetraglyme | 26.5 | 61 |

TABLE 2-continued

| | Polymer | | | Oxide Particles | | Electrolyte | Solvent | | |
|---|---|---|---|---|---|---|---|---|---|
| | Polymer Type (mass ratio of structural units) | Polymer Mixing Ratio | Content (% by mass) | Particle Type (average particle size μm) | Content (% by mass) | Salt Content (% by mass) (A) | Solvent Type | Content (% by mass) (B) | (A) + (B) |
| Example 1-13 | PVDF-HFP (95/5) | — | 26 | BaTiO₃ (0.1) | 13 | 34.5 | tetraglyme | 26.5 | 61 |
| Example 1-14 | PVDF-HFP (95/5) | — | 26 | SiO₂ (1) | 13 | 34.5 | tetraglyme | 26.5 | 61 |
| Example 1-15 | PVDF-HFP (95/5) | — | 26 | SiO₂ (3) | 13 | 34.5 | tetraglyme | 26.5 | 61 |
| Example 1-16 | PVDF-HFP (95/5) | — | 26 | SiO₂ (6) | 13 | 34.5 | tetraglyme | 26.5 | 61 |
| Example 1-17 | PVDF-HFP (98/2) | — | 26 | SiO₂ (0.1) | 13 | 34.5 | tetraglyme | 26.5 | 61 |
| Example 1-18 | PVDF-HFP (97/3) | — | 26 | SiO₂ (0.1) | 13 | 34.5 | tetraglyme | 26.5 | 61 |
| Example 1-19 | PVDF-HFP (95/5) | — | 26 | SiO₂ (0.1) | 13 | 34.5 | triglyme | 26.5 | 61 |
| Example 1-20 | PVDF-HFP (95/5) | — | 26 | SiO₂ (0.1) | 13 | 34.5 | diglyme | 26.5 | 61 |

TABLE 3

| | Polymer | | | Oxide Particles | | Electrolyte | Solvent | | |
|---|---|---|---|---|---|---|---|---|---|
| | Polymer Type (mass ratio of structural units) | Polymer Mixing Ratio | Content (% by mass) | Particle Type (average particle size μm) | Content (% by mass) | Salt Content (% by mass) (A) | Solvent Type | Content (% by mass) (B) | (A) + (B) |
| Example 1-21 | PVDF-HFP (95/5) | — | 26 | SiO2 (0.1) | 13 | 34.5 | EMI-TFSI | 26.5 | 61 |
| Example 1-22 | PVDF-HFP (95/5) | — | 26 | SiO2 (0.1) | 13 | 34.5 | EMI-DCA | 26.5 | 61 |
| Example 1-23 | PVDF + PA | 95/5 | 26 | SiO₂ (0.1) | 13 | 34.5 | tetraglyme | 26.5 | 61 |
| Example 1-24 | PVDF-MA (95/5) | — | 26 | SiO₂ (0.1) | 13 | 34.5 | tetraglyme | 26.5 | 61 |
| Example 1-25 | PTFE + PMMA | 90/10 | 26 | SiO₂ (0.1) | 13 | 34.5 | tetraglyme | 26.5 | 61 |
| Example 1-26 | PVDF + PMMA | 95/5 | 26 | SiO₂ (0.1) | 13 | 34.5 | tetraglyme | 26.5 | 61 |
| Example 1-27 | PVDF-HFP (98/2) + PMMA | 98/2 | 26 | SiO₂ (0.1) | 13 | 34.5 | tetraglyme | 26.5 | 61 |
| Example 1-28 | PVDF-HFP (98/2) + PMMA | 50/50 | 26 | SiO₂ (0.1) | 13 | 34.5 | tetraglyme | 26.5 | 61 |
| Example 1-29 | PVDF-HFP (95/5) + PAN | 91/9 | 26 | SiO₂ (0.1) | 13 | 34.5 | tetraglyme | 26.5 | 61 |
| Example 1-30 | PVDF-HFP (95/5) + PVC | 91/9 | 26 | SiO₂ (0.1) | 13 | 34.5 | tetraglyme | 26.5 | 61 |

TABLE 4

| | Polymer | | | Oxide Particles | | Electrolyte | Solvent | | |
|---|---|---|---|---|---|---|---|---|---|
| | Polymer Type (mass ratio of structural units) | Polymer Mixing Ratio | Content (% by mass) | Particle Type (average particle size μm) | Content (% by mass) | Salt Content (% by mass) (A) | Solvent Type | Content (% by mass) (B) | (A) + (B) |
| Comparative Example 1-1 | PVDF-HFP (95/5) | — | 39 | — | — | 34.5 | tetraglyme | 26.5 | 61 |
| Comparative Example 1-2 | PVDF | — | 26 | SiO₂ (0.1) | 13 | 34.5 | tetraglyme | 26.5 | 61 |
| Comparative Example 1-3 | PVDF-HFP (95/5) + PAN | 90/10 | 26 | SiO₂ (0.1) | 13 | 34.5 | tetraglyme | 26.5 | 61 |
| Comparative Example 1-4 | PVDF-HFP (95/5) + PVC | 70/30 | 26 | SiO₂ (0.1) | 13 | 34.5 | tetraglyme | 26.5 | 61 |

TABLE 4-continued

|  | Polymer | | | Oxide Particles | | Electrolyte | Solvent | | |
| --- | --- | --- | --- | --- | --- | --- | --- | --- | --- |
|  | Polymer Type (mass ratio of structural units) | Polymer Mixing Ratio | Content (% by mass) | Particle Type (average particle size μm) | Content (% by mass) | Salt Content (% by mass) (A) | Solvent Type | Content (% by mass) (B) | (A) + (B) |
| Comparative Example 1-5 | PVDF-HFP (95/5) + PAN + PVC | 90/7/3 | 26 | $SiO_2$ (0.1) | 13 | 34.5 | tetraglyme | 26.5 | 61 |
| Comparative Example 1-6 | PVDF-HFP (95/5) + PAN | 50/50 | 26 | $SiO_2$ (0.1) | 13 | 34.5 | tetraglyme | 26.5 | 61 |
| Comparative Example 1-7 | PVDF-HFP (95/5) + PAN + PVC | 33/50/17 | 26 | $SiO_2$ (0.1) | 13 | 34.5 | tetraglyme | 26.5 | 61 |
| Comparative Example 1-8 | PVDF-HFP (95/5) + PMMA | 40/60 | 26 | $SiO_2$ (0.1) | 13 | 34.5 | tetraglyme | 26.5 | 61 |

[Evaluation of Electrolyte Sheet]

The following items were evaluated for the properties of the electrolyte sheets according to the Examples and Comparative Examples. The results are shown in Table 5.

(Conductivity)

A commercially available conductivity meter was introduced into the slurry in the electrolyte sheet preparation process, and the conductivity was measured at 25° C.

(Slurry Properties)

For the properties of the slurry in the preparation process of the electrolyte sheet, the presence or absence of gelation was confirmed visually. After the slurry was produced, the slurry was left in a dry room; after 5 hours had elapsed, in cases in which not even a part of the slurry had solidified (gelled), it was determined that the slurry had not gelled, and in cases in which at least a part had solidified (gelled), it was determined that the slurry had gelled. Slurry gelation can occur when the polymer, electrolyte salt, and solvent have low mutual solubility in the dispersion medium. When gelation occurs, it is difficult to make the electrolyte sheet thin, and therefore it is preferable that gelation does not occur. In Table 5, cases in which gelation occurred are shown by a "+", and gelation did not occur are shown by a "−".

(Surface Properties of Electrolyte Composition)

The surface properties of the electrolyte composition in the electrolyte sheet were visually confirmed. It is preferable that the surface of the electrolyte composition be smooth and free from unevenness and defects. In Table 5, cases having unevenness are shown by a "+", and cases not having unevenness are shown by a "−".

(Presence/Absence of Fracture)

The presence or absence of fracture when, in the electrolyte sheet, the end of the electrolyte layer was peeled from the substrate was visually evaluated. In Table 5, cases in which fracture occurred are shown by a "+", and cases in which fracture did not occur are shown by a "−".

(Presence/Absence of Liquid Leakage)

The presence or absence of liquid leakage due to the solvent when a load was applied on the electrolyte sheet was evaluated. A resin film (a film made of polyethylene terephthalate having a thickness of 25 μm) was pressed against the cut electrolyte sheet while applying a load of 2 kg/cm². At this time, the presence or absence of adhesion of the liquid electrolyte composition was visually evaluated. In Table 5, cases in which liquid leakage occurred are shown by a "+", and cases in which liquid leakage did not occur are shown by a "−".

TABLE 5

|  | Conductivity (mS/cm) | Presence/ Absence of Slurry Gelation | Presence/ Absence of Unevenness | Presence/ Absence of Fracture During Peeling | Presence/ Absence of Liquid Leakage |
| --- | --- | --- | --- | --- | --- |
| Example 1-1 | 0.8 | − | − | − | − |
| Example 1-2 | 0.2 | − | − | − | − |
| Example 1-3 | 0.1 | − | − | − | − |
| Example 1-4 | 0.85 | − | − | + | + |
| Example 1-5 | 0.4 | − | − | − | − |
| Example 1-6 | 0.7 | − | − | − | − |
| Example 1-7 | 0.7 | − | − | − | − |
| Example 1-8 | 0.6 | − | − | − | − |
| Example 1-9 | 0.6 | − | − | − | − |
| Example 1-10 | 0.7 | − | − | − | − |
| Example 1-11 | 0.7 | − | − | − | − |
| Example 1-12 | 0.9 | − | − | − | − |
| Example 1-13 | 0.6 | − | − | − | − |
| Example 1-14 | 1 | − | − | − | − |
| Example 1-15 | 0.7 | − | − | − | − |
| Example 1-16 | 0.5 | − | − | − | − |
| Example 1-17 | 0.4 | − | − | − | − |
| Example 1-18 | 0.6 | − | − | − | − |
| Example 1-19 | 0.7 | − | − | − | − |
| Example 1-20 | 0.6 | − | − | − | − |
| Example 1-21 | 1.2 | − | − | − | − |

TABLE 5-continued

|  | Conductivity (mS/cm) | Presence/ Absence of Slurry Gelation | Presence/ Absence of Unevenness | Presence/ Absence of Fracture During Peeling | Presence/ Absence of Liquid Leakage |
|---|---|---|---|---|---|
| Example 1-22 | 1.5 | − | − | − | − |
| Example 1-23 | 0.5 | − | − | − | − |
| Example 1-24 | 0.6 | − | − | − | − |
| Example 1-25 | 0.6 | − | − | − | − |
| Example 1-26 | 0.7 | − | − | − | − |
| Example 1-27 | 1 | − | − | − | − |
| Example 1-28 | 1.1 | − | − | − | − |
| Example 1-29 | 0.08 | − | − | − | − |
| Example 1-30 | 0.1 | − | − | − | − |
| Comparative Example 1-1 | 0.03 | − | − | + | + |
| Comparative Example 1-2 | 0.03 | + | + | + | + |
| Comparative Example 1-3 | 0.02 | + | + | + | − |
| Comparative Example 1-4 | 0.01 | + | + | + | − |
| Comparative Example 1-5 | 0.03 | + | + | + | − |
| Comparative Example 1-6 | 0.008 | + | + | + | + |
| Comparative Example 1-7 | 0.007 | + | + | + | + |
| Comparative Example 1-8 | − | − | + | + | + |

A comparison of the conductivity of Examples 1-1 to 1-4 in which the content of each material was changed showed a tendency for the conductivity to increase the larger the total content ((A)+(B)) of the electrolyte salt and the solvent is, that is, the larger the amount of the electrolyte salt added is.

Example 1-5, in which the content of oxide particles was increased and the content of (A)+(B) was decreased compared to Example 1-1, showed a slightly lower conductivity due to the decrease in electrolyte salt content than Example 1-1, but has a higher conductivity than Example 1-2, which contained almost the same amount of electrolyte salt. In other words, it was found that conductivity is further improved by increasing the content of the oxide particles.

Examples 1-6 to 1-13, in which the type of oxide particles was changed, had a conductivity of 0.6 mS/cm or more regardless of the oxide particles that were used.

Examples 1-14 to 1-16, in which the average particle size of the oxide particles was changed, exhibited, as compared with the Examples including Example 1-1, about the same conductivity as Example 1-14 and Example 1-15, in which the average particle size of the oxide particles was 0.1 μm to 3 μm, but it was found that the conductivity of Example 1-16, in which the average particle size of the oxide particles was 6 μm, tended to decrease slightly. From this result, it can be seen that although it is possible to obtain an electrolyte sheet having excellent strength and conductivity by using oxide particles having an average particle size of up to about 6 μm, in order to further improve conductivity, the average particle size is desirably 1 μm or less.

Examples 1-17 to 1-18, in which the content of hexafluoropropylene in the polymer was changed, showed that, as compared with the Examples including Example 1-1, conductivity tended to increase as the content of hexafluoropropylene increased.

Among Examples 1-19 to 1-22 in which the type of solvent was changed, in Examples 1-21 and 1-22, the conductivity exceeded 1 mS/cm.

Regarding Examples 1-23 to 1-30, in which the type of polymer was changed, Example 1-28 using three polymers consisting of a first structural unit and a second structural unit, had the highest conductivity.

The conductivity of Comparative Example 1-1, which did not contain oxide particles, was inferior to that of Examples 1-1 to 1-30.

The conductivity of Comparative Example 1-2, in which a polymer that did not contain the second structural unit was used, and Comparative Examples 1-3 to 1-7, in which the content of the polymer containing the first structural unit and the second structural unit was 90% by mass or less based on the total amount of the polymer, were inferior to the conductivity of Examples 1-1 to 1-30. In addition, the slurries in Comparative Examples 1-2 to 1-7 gelled, and unevenness occurred on the surface of the electrolyte composition. Regarding liquid leakage, the larger the content of the polymer (PVDF-HFP) containing the first structural unit, the less likely liquid leakage occurs; however, when the content decreases as in Comparative Example 1-6, liquid leakage occurred. In Comparative Example 1-8, in which the mass ratio of the content of the first structural unit to the content of the second structural unit was less than 50/50, unevenness occurred on the surface of the electrolyte composition.

Test Example 2

Example 2-1

[Manufacture of Electrolyte Sheet]

A slurry containing an electrolyte composition was prepared by dispersing in an NMP, which is a dispersion medium, 21% by mass of PVDF-HFP (vinylidene fluoride/hexafluoropyrene (mass ratio)=95/5), 14% by mass of $SiO_2$ particles (average particle size 0.1 μm) as oxide particles, and 65% by mass of an electrolyte solution in which lithium bis(trifluoromethanesulfonyl)imide (Li[TF SI]) as an electrolyte salt was dissolved in an ionic liquid (N,N-diethyl- N-methyl-N-(2-methoxyethyl)ammonium-bis(trifluoromethanesulfonyl)imide (DEME-TFSI) to a concentration of 1.5 mol/L. A polyethylene terephthalate substrate was coated with the obtained slurry, and heated to volatilize the dispersion medium to obtain an electrolyte sheet. The thickness of the electrolyte layer in the obtained electrolyte sheet was 25±2 µm. Hereinafter, the composition of the ionic liquid in which the electrolyte salt was dissolved may be expressed as "concentration of lithium salt/type of lithium salt/type of ionic liquid".

[Manufacture of Lithium Ion Secondary Battery]

A positive electrode mixture was prepared by mixing 78.5 parts by mass of a layered lithium/nickel/manganese/cobalt composite oxide (positive electrode active material), 5 parts by mass of acetylene black (conductive agent, trade name: HS-100, average particle size 48 nm, manufactured by Denka Company Ltd.), 2.5 parts by mass of a copolymer solution of vinylidene fluoride and hexafluoropropylene (solid content of 12% by mass), and 14 parts by mass of an ionic liquid (1.5 mol/L/Li[FSI]/Py13-FSI) in which an electrolyte salt was dissolved. A positive electrode current collector (20 µm-thick aluminum foil) was coated with this positive electrode mixture slurry in a coating mass of 125 g/m$^2$, heated at 80° C., and dried to form a positive electrode mixture layer having a mixture density of 2.7 g/cm$^3$. This was cut into a width of 30 mm and a length of 45 mm to form a positive electrode plate, and a positive electrode current collecting tab was attached to the positive electrode plate as illustrated in FIG. 2.

A negative electrode mixture slurry was prepared by mixing 78 parts by mass of a graphite 1 (negative electrode active material, manufactured by Hitachi Chemical Company Ltd.), 2.4 parts by mass of a graphite 2 (manufactured by Nippon Graphite Industries Co., Ltd.), 0.6 parts by mass of carbon fiber (conductive agent, trade name: VGCF-H, manufactured by Showa Denko K. K.), 5 parts by mass of a copolymer solution of vinylidene fluoride and hexafluoropropylene (solid content: 12% by mass), and 14 parts by mass of an ionic liquid in which an electrolyte salt was dissolved (1.5 M/Li[FSI]/Py13-FSI). A current collector (copper foil having a thickness of 10 µm) was coated with this negative electrode mixture slurry in a coating mass of 60 g/m$^2$, heated at 80° C., and dried to form a negative electrode mixture layer having a mixture density of 1.8 g/cm$^3$. This was cut to a width of 31 mm and a length of 46 mm to form a negative electrode plate, and a negative electrode current collecting tab was attached to the negative electrode plate as illustrated in FIG. 2.

The substrate was peeled from the electrolyte sheet and disposed between the produced positive electrode plate and negative electrode plate to produce a laminated electrode group.

The electrode group was housed in a battery outer casing made of an aluminum laminate film, as illustrated in FIG. 1. Inside the battery outer casing, the positive electrode current collecting tab and the negative electrode current collecting tab were pulled out and the opening of the battery container was sealed to manufacture the lithium ion secondary battery of Example 2-1. The aluminum laminate film was a laminate of polyethylene terephthalate (PET) film/aluminum foil/sealant layer (polypropylene, etc.). The design capacity of the manufactured lithium ion secondary battery was 20 mAh.

Examples 2-2 to 2-3

Lithium ion secondary batterys were manufactured in the same manner as in Example 2-1, except that the mass ratio of the electrolyte (electrolyte salt and solvent) content to the electrolyte support material (material other than the electrolyte salt and solvent) content (electrolyte content/electrolyte support material content) in the electrolyte sheet was changed to the mass ratio shown in Table 6.

Examples 2-4 to 2-5

Lithium ion secondary batterys were manufactured in the same manner as in Example 2-1, except that the concentration of the electrolyte salt of the electrolyte in the electrolyte sheet was changed to that shown in Table 6.

Examples 2-6 to 2-7

Lithium ion secondary batterys were manufactured in the same manner as in Example 2-1, except that the electrolyte salt and the solvent of the electrolyte in the electrolyte sheet were changed to those shown in Table 6.

Example 2-8

A lithium ion secondary battery was manufactured in the same manner as in Example 2-1, except that the average particle size of the oxide particles in the electrolyte sheet was changed to that shown in Table 6.

Examples 2-9 to 2-10

Lithium ion secondary batterys were manufactured in the same manner as in Example 2-1, except that the mass ratio of the polymer content to the oxide particle content (polymer content/oxide particle content) in the electrolyte sheet was changed to that shown in Table 6.

Examples 2-11 to 2-12

Lithium ion secondary batterys were manufactured in the same manner as in Example 2-1, except that the mass ratio of the structural units in the polymer in the electrolyte sheet was changed to that shown in Table 7.

Example 2-13

A lithium ion secondary battery was manufactured in the same manner as in Example 2-1, except that the average particle size of oxide particles, the type of electrolyte salt, the type of solvent, and the electrolyte content/electrolyte support material content in the electrolyte sheet were changed to those shown in Table 7.

Example 2-14

A lithium ion secondary battery was manufactured in the same manner as in Example 2-13, except that the average particle size of the oxide particles in the electrolyte sheet was changed to that shown in Table 7.

Example 2-15

A lithium ion secondary battery was manufactured in the same manner as in Example 2-13, except that the electrolyte content/electrolyte support material content (mass ratio) in the electrolyte sheet was changed to that shown in Table 7.

Examples 2-16 to 2-17

Lithium ion secondary batterys were manufactured in the same manner as in Example 2-13, except that the polymer content/oxide particle content (mass ratio) and the electrolyte content/electrolyte support material content (mass ratio) in the electrolyte sheet were changed to those shown in Table 7.

Example 2-18

A lithium ion secondary battery was manufactured in the same manner as in Example 2-13, except that the type of the ionic liquid for the electrolyte sheet was changed to that shown in Table 7.

Example 2-19

A lithium ion secondary battery was manufactured in the same manner as in Example 2-18, except that the average particle size of the oxide particles in the electrolyte sheet was changed to that shown in Table 7.

Example 2-20

A lithium ion secondary battery was manufactured in the same manner as in Example 2-18, except that the electrolyte content/electrolyte support material content in the electrolyte sheet was changed to that shown in Table 7.

TABLE 6

| | Electrolyte Support Material | | | Electrolyte | | | Electrolyte Content/Electrolyte Support Material Content (mass ratio) |
|---|---|---|---|---|---|---|---|
| | Polymer Type (mass ratio of structural units) | Oxide Particles (average particle size μm) | Polymer Content/Oxide Particle Content (mass ratio) | Electrolyte Salt Type | Electrolyte Salt Concentration (mol/L) | Solvent Type | |
| Example 2-1 | PVDF-HFP (95/5) | 0.1 | 3/2 | Li [TFSI] | 1.5 | DEME-TFSI | 35/65 |
| Example 2-2 | PVDF-HFP (95/5) | 0.1 | 3/2 | Li [TFSI] | 1.5 | DEME-TFSI | 42.5/57.5 |
| Example 2-3 | PVDF-HFP (95/5) | 0.1 | 3/2 | Li [TFSI] | 1.5 | DEME-TFSI | 50/50 |
| Example 2-4 | PVDF-HFP (95/5) | 0.1 | 3/2 | Li [TFSI] | 2 | DEME-TFSI | 35/65 |
| Example 2-5 | PVDF-HFP (95/5) | 0.1 | 3/2 | Li [TFSI] | 1 | DEME-TFSI | 35/65 |
| Example 2-6 | PVDF-HFP (95/5) | 0.1 | 3/2 | Li [FSI] | 1.5 | EMI-FSI | 35/65 |
| Example 2-7 | PVDF-HFP (95/5) | 0.1 | 3/2 | Li [FSI] | 1.5 | Py13-FSI | 35/65 |
| Example 2-8 | PVDF-HFP (95/5) | 1 | 3/2 | Li [TFSI] | 1.5 | DEME-TFSI | 35/65 |
| Example 2-9 | PVDF-HFP (95/5) | 0.1 | 2/1 | Li [TFSI] | 1.5 | DEME-TFSI | 35/65 |
| Example 2-10 | PVDF-HFP (95/5) | 0.1 | 1/1 | Li [TFSI] | 1.5 | DEME-TFSI | 35/65 |

TABLE 7

| | Electrolyte Support Material | | | Electrolyte | | | Electrolyte Content/Electrolyte Support Material Content (mass ratio) |
|---|---|---|---|---|---|---|---|
| | Polymer Type (mass ratio of structural units) | Oxide Particles (average particle size μm) | Polymer Content/Oxide Particle Content (mass ratio) | Electrolyte Salt Type | Electrolyte Salt Concentration (mol/L) | Solvent Type | |
| Example 2-11 | PVDF-HFP (97/3) | 0.1 | 3/2 | Li [TFSI] | 1.5 | DEME-TFSI | 35/65 |
| Example 2-12 | PVDF-HFP (93/7) | 0.1 | 3/2 | Li [TFSI] | 1.5 | DEME-TFSI | 35/65 |
| Example 2-13 | PVDF-HFP (95/5) | 0.04 | 3/2 | Li [FSI] | 1.5 | Py13-FSI | 57/43 |
| Example 2-14 | PVDF-HFP (95/5) | 0.01 | 3/2 | Li [FSI] | 1.5 | Py13-FSI | 57/43 |
| Example 2-15 | PVDF-HFP (95/5) | 0.04 | 3/2 | Li [FSI] | 1.5 | Py13-FSI | 50/50 |
| Example 2-16 | PVDF-HFP (95/5) | 0.04 | 3/1 | Li [FSI] | 1.5 | Py13-FSI | 51/49 |
| Example 2-17 | PVDF-HFP (95/5) | 0.04 | 1/1 | Li [FSI] | 1.5 | Py13-FSI | 62/38 |
| Example 2-18 | PVDF-HFP (95/5) | 0.04 | 3/2 | Li [FSI] | 1.5 | EMI-FSI | 57/43 |
| Example 2-19 | PVDF-HFP (95/5) | 0.01 | 3/2 | Li [FSI] | 1.5 | EMI-FSI | 57/43 |
| Example 2-20 | PVDF-HFP (95/5) | 0.04 | 3/2 | Li [FSI] | 1.5 | EMI-FSI | 50/50 |

[Evaluation of Electrolyte Sheet]

The electrolyte sheets manufactured in Examples 2-1 to 2-20 were evaluated regarding their conductivity, slurry properties, the surface properties of the electrolyte composition, and the presence or absence of liquid leakage in the same manner as in Test Example 1. The results are shown in Table 8.

[Evaluation of Initial Characteristics of Lithium Ion Secondary Batterys]

Using a charge/discharge device (BATTERY TEST UNIT, manufactured by IEM Co., Ltd.), the lithium ion secondary batterys manufactured in the above Examples 2-1 to 2-20 were charged at a constant current with a current value of 0.2 C to a charge end voltage of 4.2 V at 25° C. After resting for 15 minutes, constant current discharge was performed at a current value of 0.2 C to a discharge end voltage of 2.7 V. Charging/discharging was repeated 3 times under the above charge/discharge conditions, and the discharge capacity at the third cycle (initial capacity) was measured. The initial characteristics of the lithium ion secondary battery were calculated from the following formula (9). The results are shown in Table 8.

Initial characteristics (%)=(initial capacity/design capacity)×100       (9)

sphere was dissolved in tetraglyme (tetraethylene glycol dimethyl ether, G4) such that the electrolyte salt had a concentration of 2.3 mol/L. The electrolyte solution was further added to the slurry, followed by mixing, and the mass ratio of the polymer, oxide particles, and electrolyte solution was polymer:oxide particles:electrolyte solution=30:20:50. Thereafter, NMP was further added to adjust the viscosity, and a polyethylene terephthalate substrate (product name: Teonex R-Q51, manufactured by Teijin-DuPont Films, Inc., thickness 38 μm) was coated with the slurry using an applicator. The slurry used for coating was heated and dried at 100° C. for 2 hours to volatilize the dispersion medium and obtain an electrolyte sheet.

[Manufacture of Coin Battery Battery for Evaluation]

A coin battery battery for evaluation was manufactured using a positive electrode including $LiNi_{1/3}Mn_{1/3}Co_{1/3}$ as a positive electrode active material, an electrolyte sheet, and a negative electrode including natural graphite as a negative electrode active material. The positive electrode, the electrolyte layer obtained by peeling the substrate from the electrolyte sheet, and the negative electrode were stacked in that order, placed in a CR2016 type coin battery container, a small amount of liquid (electrolyte solution) with the same composition as the slurry used to manufacture the electrolyte

TABLE 8

| | Conductivity (mS/cm) | Presence/ Absence of Slurry Gelation | Presence/ Absence of Unevenness | Presence/ Absence of Liquid Leakage | Initial Characteristics (%) |
|---|---|---|---|---|---|
| Example 2-1 | 0.21 | − | − | − | 98 |
| Example 2-2 | 0.15 | − | − | − | 99 |
| Example 2-3 | 0.10 | − | − | − | 98 |
| Example 2-4 | 0.18 | − | − | − | 96 |
| Example 2-5 | 0.25 | − | − | − | 99 |
| Example 2-6 | 1.02 | − | − | − | 97 |
| Example 2-7 | 0.51 | − | − | − | 97 |
| Example 2-8 | 0.20 | − | − | − | 97 |
| Example 2-9 | 0.15 | − | − | − | 90 |
| Example 2-10 | 0.22 | − | − | − | 98 |
| Example 2-11 | 0.17 | − | − | − | 96 |
| Example 2-12 | 0.23 | − | − | − | 95 |
| Example 2-13 | 0.48 | − | − | − | 100 |
| Example 2-14 | 0.56 | − | − | − | 100 |
| Example 2-15 | 0.93 | − | − | − | 100 |
| Example 2-16 | 1.12 | − | − | − | 100 |
| Example 2-17 | 1.84 | − | − | − | 100 |
| Example 2-18 | 2.51 | − | − | − | 100 |
| Example 2-19 | 2.73 | − | − | − | 100 |
| Example 2-20 | 2.12 | − | − | − | 100 |

Test Example 3 (Reference)

In order to investigate the relationship of the average primary particle size of the oxide particles included in the electrolyte composition with the tensile strength and discharge rate characteristics of the electrolyte composition formed into a sheet, the following tests were performed.

Reference Example 3-1

[Manufacture of Electrolyte Sheet]

A slurry containing an electrolyte composition was prepared by dispersing in an NMP, which is a dispersion medium, PVDF-HFP (vinylidene fluoride/hexafluoropyrene (mass ratio)=95/5), $SiO_2$ particles (average primary particle size of about 1 μm, trade name: AEROSIL SO-C4, manufactured by Nippon Aerosil Co., Ltd.) as oxide particles, and an electrolyte solution in which lithium bis(trifluoromethanesulfonyl)imide (LiTFSI) dried under a dry argon atmosheet was then added, and the upper part of the battery container was crimped and sealed via an insulating gasket. The electrolyte solution was added such that it was 130 to 200% of the void volume of the positive electrode and the negative electrode. The void volume of the electrode mixture layer was calculated according to the following formulae after measuring the apparent volume (area×thickness) of the electrode mixture layer excluding the current collector.

Void volume of positive electrode mixture layer=apparent volume of positive electrode mixture layer−(mass of positive electrode active material/true density of positive electrode active material)−(mass of conductive agent/true density of conductive agent)−(mass of binder/true density of binder)

Void volume of negative electrode mixture layer=apparent volume of negative electrode mixture layer−(mass of negative electrode active material/true density of negative electrode active material)–(mass of conductive agent/true density of conductive agent)–(mass of binder/true density of binder)

Reference Example 3-2

A coin battery battery for evaluation was manufactured in the same manner as in Example 3-1, except that the oxide particles used in the electrolyte sheet were SiO$_2$ particles (average primary particle size of about 1 μm, product name: AEROSIL SX-C7, manufactured by Nippon Aerosil Co., Ltd.) that had been surface treated (phenylaminosilane treatment).

Reference Example 3-3

A coin battery battery for evaluation was manufactured in the same manner as in Example 3-1, except that the oxide particles used in the electrolyte sheet were SiO$_2$ particles having a different average primary particle size (average primary particle size of about 2 μm, product name: AEROSIL SO-C6, manufactured by Nippon Aerosil Co., Ltd.).

Reference Example 3-4

A coin battery battery for evaluation was manufactured in the same manner as in Example 3-1, except that the oxide particles used in the electrolyte sheet were SiO$_2$ particles having a different average primary particle size (average primary particle size of about 0.04 μm, product name: AEROSIL OX-10, manufactured by Nippon Aerosil Co., Ltd.).

[Evaluation of Electrolyte Sheet]
(Tensile Strength)

The obtained electrolyte sheets were cut to a width of 5 mm, sandwiched between chucks, and then fixed to a pedestal with tape such that their length was 20 mm. Then, the electrolyte sheets were pulled by using a force gauge (manufactured by NIDEC-SHIMPO CORPORATION, FGP-5), and the strength when the electrolyte sheet fractured was measured. The results are shown in Table 9.

[Evaluation of Discharge Rate Characteristics of Coin Battery Battery for Evaluation]

The discharge rate characteristics of the obtained coin battery batteries at 25° C. was measured under the following charge/discharge conditions using a charge/discharge device (manufactured by Toyo System Co., Ltd.).

(1) A cycle in which charging was performed at a constant current and constant voltage (CCCV) at 0.05 C to an end voltage of 4.2 V and then discharging was performed at a constant current (CC) at 0.05 C to an end voltage of 2.7 V was repeated twice. Here, "C" means "current value (A)/battery capacity (Ah)".

(2) Next, a cycle in which charging was performed at a constant current and constant voltage (CCCV) at 0.05 C to an end voltage of 4.2 V and then discharging was performed at a constant current (CC) at 0.1 C to an end voltage of 2.7 V was carried out once. Further, the rate of constant current (CC) discharge was changed to 0.2, 0.3, 0.5, and 1.0 C for each cycle, and the discharge rate characteristics were evaluated. Table 9 shows the discharge rate characteristics of 0.2 C with respect to 0.05 C.

TABLE 9

| | Average Primary Particle Size of Oxide Particles (μm) | Oxide Particles Surface Treatment | Tensile Strength (MPa) | Discharge Rate Characteristics (%) |
|---|---|---|---|---|
| Reference Example 3-1 | 1 | — | 2.4 | 92.2 |
| Reference Example 3-2 | 1 | phenyl-aminosilane treatment | 3.4 | 92.3 |
| Reference Example 3-3 | 2 | — | 2.7 | 93.2 |
| Reference Example 3-4 | 0.04 | — | 1.7 | 93.4 |

REFERENCE SIGNS LIST

1 . . . secondary battery, 6 . . . positive electrode, 7 . . . electrolyte layer, 8 . . . negative electrode, 13A, 13B . . . electrolyte sheet, 14 . . . substrate.

The invention claimed is:

1. An electrolyte composition formed into a sheet, comprising:
two or more polymers;
oxide particles;
at least one electrolyte salt selected from the group consisting of a lithium salt, a sodium salt, a calcium salt, and a magnesium salt; and
a solvent, wherein
structural units constituting the two or more polymers comprise a first structural unit selected from the group consisting of tetrafluoroethylene and vinylidene fluoride; a second structural unit selected from the group consisting of hexafluoropropylene, maleic acid, and methyl methacrylate; or both,
a content of the two or more polymers is more than 90% by mass based on a total amount of polymers in the electrolyte composition and is 25% by mass or more based on the total amount of the electrolyte composition,
a content of the oxide particles is 40% by mass or less based on a total amount of the electrolyte composition,
the solvent comprises a glyme represented by the following formula (1) or an ionic liquid and the content of the solvent is 40% by mass or less based on a total amount of the electrolyte composition, and
the two or more polymers comprise a first polymer which is a copolymer comprising the first structural unit and the second structural unit; and a second polymer consisting of the second structural unit, or consisting of the second structural unit and a structural unit of ethylene oxide (—CH$_2$CH$_2$O—) or a carboxylic acid ester (—CH$_2$COO—),
wherein a mass ratio of a content of the first structural unit to a content of the second structural unit in the two or more polymers is 80/20 or more,
wherein the content of the two or more polymers is 25 to 30% by mass based on a total amount of the electrolyte composition, $$R^1O-(CH_2CH_2O)_k-R^2 \qquad (1)$$

wherein $R^1$ and $R^2$ each independently represent an alkyl group having 4 or less carbon atoms or a fluoroalkyl group having 4 or less carbon atoms, and k represents an integer of 1 to 6.

2. The electrolyte composition according to claim 1, wherein the oxide particles are particles of at least one selected from the group consisting of $SiO_2$, $Al_2O_3$, AlOOH, MgO, CaO, $ZrO_2$, $TiO_2$, $Li_7La_3Zr_2O_{12}$, and $BaTiO_3$.

3. The electrolyte composition according to claim 1, wherein a content of the oxide particles is 5 to 40% by mass based on a total amount of the electrolyte composition.

4. The electrolyte composition according to claim 1, wherein
the ionic liquid comprises, as a cation component, at least one selected from the group consisting of a chain-like quaternary onium cation, a piperidinium cation, a pyrrolidinium cation, a pyridinium cation, and an imidazolium cation, and
the ionic liquid comprises, as an anion component, at least one of anion components represented by the following formula (2), $$N(SO_2C_mF_{2m+1})(SO_2C_nF_{2n+1})^- \qquad (2)$$

wherein m and n each independently represent an integer of 0 to 5.

5. The electrolyte composition according to claim 1, wherein a total content of the electrolyte salt and the solvent is 25 to 70% by mass based on a total amount of the electrolyte composition.

6. A secondary battery, comprising:
a positive electrode;
a negative electrode; and
an electrolyte layer consisting of the electrolyte composition according to claim 1 disposed between the positive electrode and the negative electrode.

7. A method for manufacturing an electrolyte sheet, comprising:
disposing on a substrate a slurry comprising a mixture of two or more polymers, oxide particles, at least one electrolyte salt selected from the group consisting of a lithium salt, a sodium salt, a calcium salt, and a magnesium salt, a solvent, and a dispersion medium; and
volatilizing the dispersion medium to form an electrolyte layer on the substrate, wherein
structural units constituting the two or more polymers comprise a first structural unit selected from the group consisting of tetrafluoroethylene and vinylidene fluoride; a second structural unit selected from the group consisting of hexafluoropropylene, maleic acid, and methyl methacrylate; or both,
a content of the two or more polymers is more than 90% by mass based on a total amount of polymers in a solid content of the slurry and is 25% by mass or more based on the total amount of the electrolyte layer,
a content of the oxide particles is 40% by mass or less based on a total amount of the electrolyte layer,
the solvent comprises a glyme represented by the following formula (1) or an ionic liquid and the content of the solvent is 40% by mass or less based on a total amount of the electrolyte composition, and
the two or more polymers comprise a first polymer which is a copolymer comprising the first structural unit and the second structural unit; and a second polymer consisting of the second structural unit, or consisting of the second structural unit and a structural unit of ethylene oxide ($-CH_2CH_2O-$) or a carboxylic acid ester ($-CH_2COO-$),
wherein a mass ratio of a content of the first structural unit to a content of the second structural unit in the two or more polymers is 80/20 or more,
wherein the content of the two or more polymers is 25 to 30% by mass based on a total amount of the electrolyte composition, $$R^1O-(CH_2CH_2O)_k-R^2 \qquad (1)$$

wherein $R^1$ and $R^2$ each independently represent an alkyl group having 4 or less carbon atoms or a fluoroalkyl group having 4 or less carbon atoms, and k represents an integer of 1 to 6.

8. The method for manufacturing an electrolyte sheet according to claim 7, wherein a content of the oxide particles is 5 to 40% by mass or less based on a total amount of the electrolyte layer.

9. The method for manufacturing an electrolyte sheet according to claim 7, wherein a content of the oxide particles is 5 to 40% by mass or less based on a total amount of the electrolyte layer.

10. The electrolyte composition according to claim 1, wherein a content of the oxide particles is 5 to 40% by mass or less based on a total amount of the electrolyte composition.

* * * * *